(12) United States Patent
Murray et al.

(10) Patent No.: US 11,383,264 B2
(45) Date of Patent: Jul. 12, 2022

(54) SYSTEM FOR APPLYING FINISHING COMPOUND

(71) Applicant: Level 5 Tools, LLC, Kansas City, KS (US)

(72) Inventors: Scott A. Murray, Kansas City, KS (US); Sun Xiaowei, Yongkang (CN)

(73) Assignee: Level 5 Tools, LLC, Kansas City, KS (US)

( * ) Notice: Subject to any disclaimer, the term of this patent is extended or adjusted under 35 U.S.C. 154(b) by 16 days.

(21) Appl. No.: 16/836,345

(22) Filed: Mar. 31, 2020

(65) Prior Publication Data
US 2020/0222936 A1   Jul. 16, 2020

Related U.S. Application Data

(63) Continuation-in-part of application No. 16/045,244, filed on Jul. 25, 2018, now Pat. No. 10,669,726, (Continued)

(51) Int. Cl.
*B05C 17/005* (2006.01)
*F16K 31/60* (2006.01)
(Continued)

(52) U.S. Cl.
CPC .......... *B05C 5/0229* (2013.01); *B05C 17/002* (2013.01); *B05C 17/00573* (2013.01);
(Continued)

(58) Field of Classification Search
CPC ........ B05C 17/00503; B05C 17/00513; B05C 17/0136; B05C 17/014; B05C 17/0146;
(Continued)

(56) References Cited

U.S. PATENT DOCUMENTS 2,575,180 A * 11/1951 Lurz ...................... A61M 11/00
                                                              401/264
2,637,470 A *  5/1953 Wolcott ............... B65D 47/248
                                                              222/481

(Continued)

OTHER PUBLICATIONS

"International Search Report and Written Opinion, PCT/US2021/025197".

*Primary Examiner* — David P Angwin
*Assistant Examiner* — Bradley S Oliver
(74) *Attorney, Agent, or Firm* — Law Office of Mark Brown, LLC; Mark E. Brown

(57) ABSTRACT

A system for finishing surfaces with a finishing material includes a handle assembly with proximal and distal ends. A material reservoir is mounted on the handle distal and includes an inlet and an outlet. A material applicator tool is mounted on the reservoir and receives material from the reservoir outlet. A discharge mechanism includes an extendable-retractable component or linear actuator connected to the reservoir for discharging or reloading material. Multiple embodiments utilizing different linear actuators are disclosed. An alternative embodiment includes a push-to-open valve mechanism. Additional embodiments include an adjustment mechanism on the push-to-open valve mechanism accommodating adjustment of flow of finishing compound when the push-to-open valve is engaged.

12 Claims, 40 Drawing Sheets

Related U.S. Application Data which is a continuation-in-part of application No. 15/721,601, filed on Sep. 29, 2017, now Pat. No. 10,633,871.

(60) Provisional application No. 62/401,579, filed on Sep. 29, 2016.

(51) Int. Cl.
  *B05C 17/10* (2006.01)
  *B05C 17/00* (2006.01)
  *B05C 5/02* (2006.01)

(52) U.S. Cl.
  CPC ........ *B05C 17/00576* (2013.01); *B05C 17/10* (2013.01); *F16K 31/60* (2013.01)

(58) Field of Classification Search
  CPC .... B05C 17/015; B65D 47/24; B65D 47/241; B65D 47/243; B65D 47/245; B65D 47/247; E04F 21/02; E04F 21/023; E04F 21/026; F16K 23/00
  See application file for complete search history.

(56) References Cited

U.S. PATENT DOCUMENTS

| | | | |
|---|---|---|---|
| 2,746,085 A * | 5/1956 | Sailors | B05C 17/0146 401/179 |
| 4,376,498 A * | 3/1983 | Davis, Jr. | B05C 17/015 222/326 |
| 4,946,077 A * | 8/1990 | Olsen | F16N 3/12 184/105.2 |
| 4,986,475 A | 1/1991 | Spadafora et al. | |
| 5,882,691 A * | 3/1999 | Conboy | E04F 21/06 425/87 |
| 5,902,451 A | 5/1999 | O'Mara et al. | |
| 5,953,799 A | 9/1999 | Panaccione et al. | |
| 6,260,238 B1 | 7/2001 | Macmillan | |
| 6,473,939 B1 | 11/2002 | Stegmaier | |
| 6,581,805 B2 | 6/2003 | Conboy et al. | |
| 6,726,868 B1 | 4/2004 | Panfili et al. | |
| 6,742,215 B2 | 6/2004 | Panfili et al. | |
| 6,793,428 B2 | 9/2004 | Lithgow | |
| D508,638 S | 8/2005 | Meyer et al. | |
| 7,114,869 B2 | 10/2006 | MacMillan | |
| D541,616 S | 5/2007 | Bruno et al. | |
| D545,168 S | 6/2007 | Rudder | |
| D549,070 S | 8/2007 | Bruno et al. | |
| D551,053 S | 9/2007 | Bruno et al. | |
| D553,939 S | 10/2007 | Bruno et al. | |
| D553,941 S | 10/2007 | Bruno et al. | |
| D564,383 S | 3/2008 | Petrucelli et al. | |
| D565,921 S | 4/2008 | Bruno et al. | |
| 7,434,318 B2 | 10/2008 | Perez et al. | |
| 7,458,127 B2 | 12/2008 | Bruno et al. | |
| D584,126 S | 1/2009 | Meyer | |
| 7,556,447 B2 | 7/2009 | Bruggeman et al. | |
| D614,471 S | 4/2010 | Meyer et al. | |
| 8,381,789 B2 | 2/2013 | Payne | |
| 8,517,077 B2 | 8/2013 | Payne | |
| 8,747,006 B2 | 6/2014 | Payne | |
| 9,051,744 B1 | 6/2015 | Murray et al. | |
| 9,283,586 B2 | 3/2016 | Macmillan | |
| D838,159 S | 1/2019 | Jimenez et al. | |
| 2001/0003563 A1 | 6/2001 | Schauer et al. | |
| 2010/0260530 A1 * | 10/2010 | Schlecht | E04F 21/1652 401/48 |
| 2011/0020050 A1 | 1/2011 | Sandahl et al. | |
| 2015/0328607 A1 | 11/2015 | Wittbold et al. | |
| 2016/0121287 A1 | 5/2016 | Brown et al. | |
| 2017/0065950 A1 | 3/2017 | Schenck et al. | |
| 2018/0087281 A1 | 3/2018 | Murray | |
| 2018/0328052 A1 | 11/2018 | Murray et al. | |

* cited by examiner

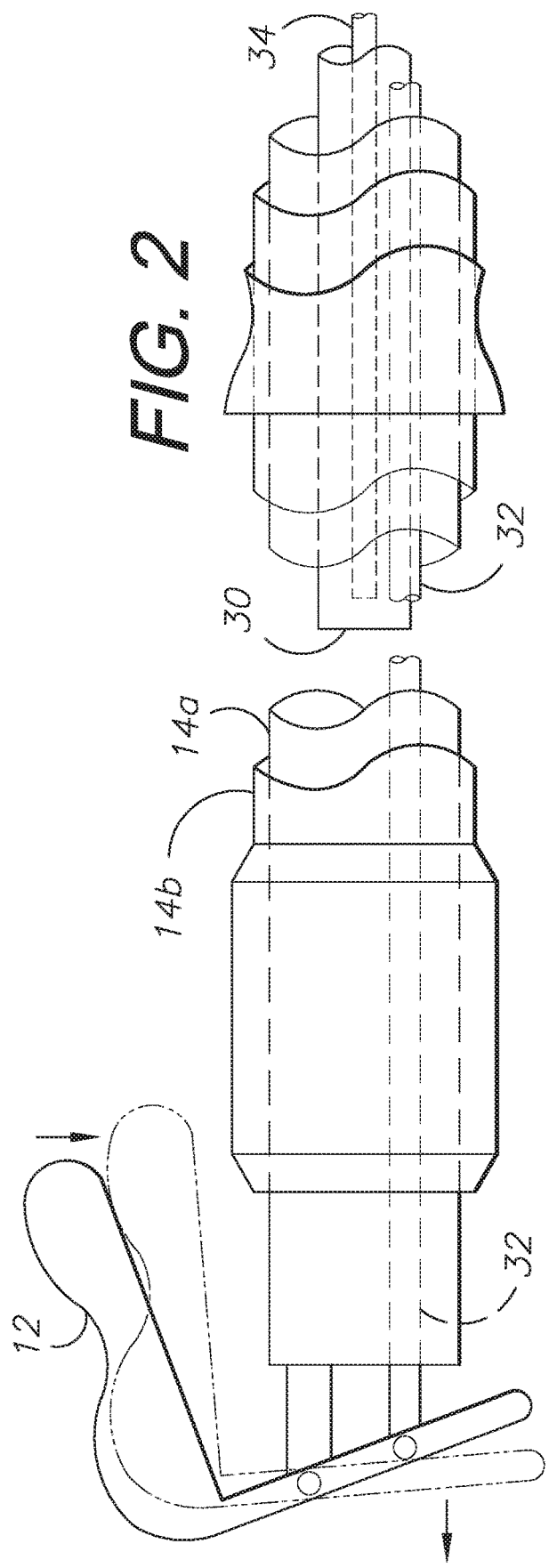
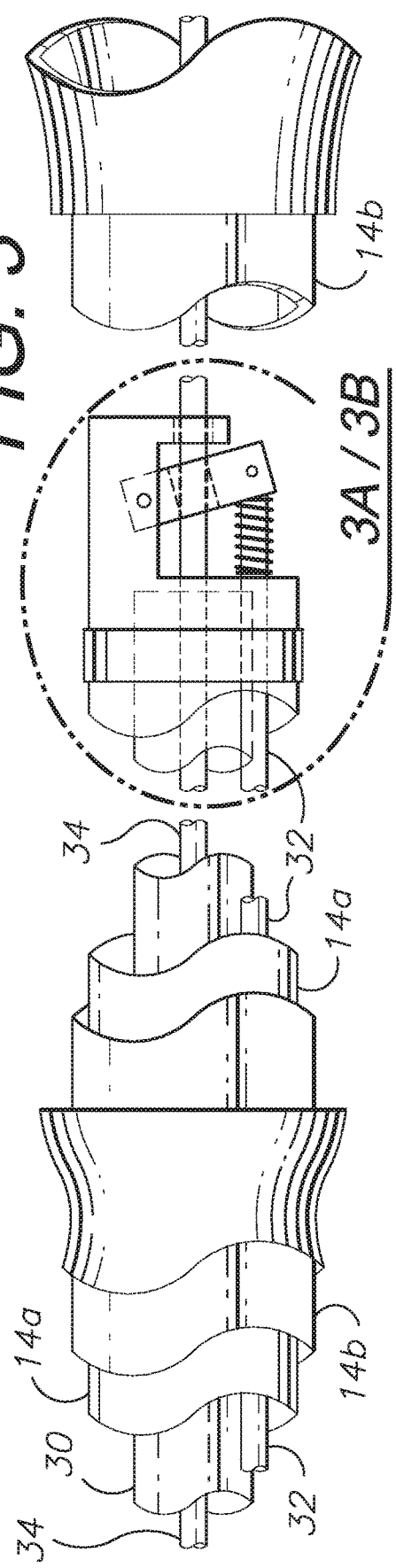

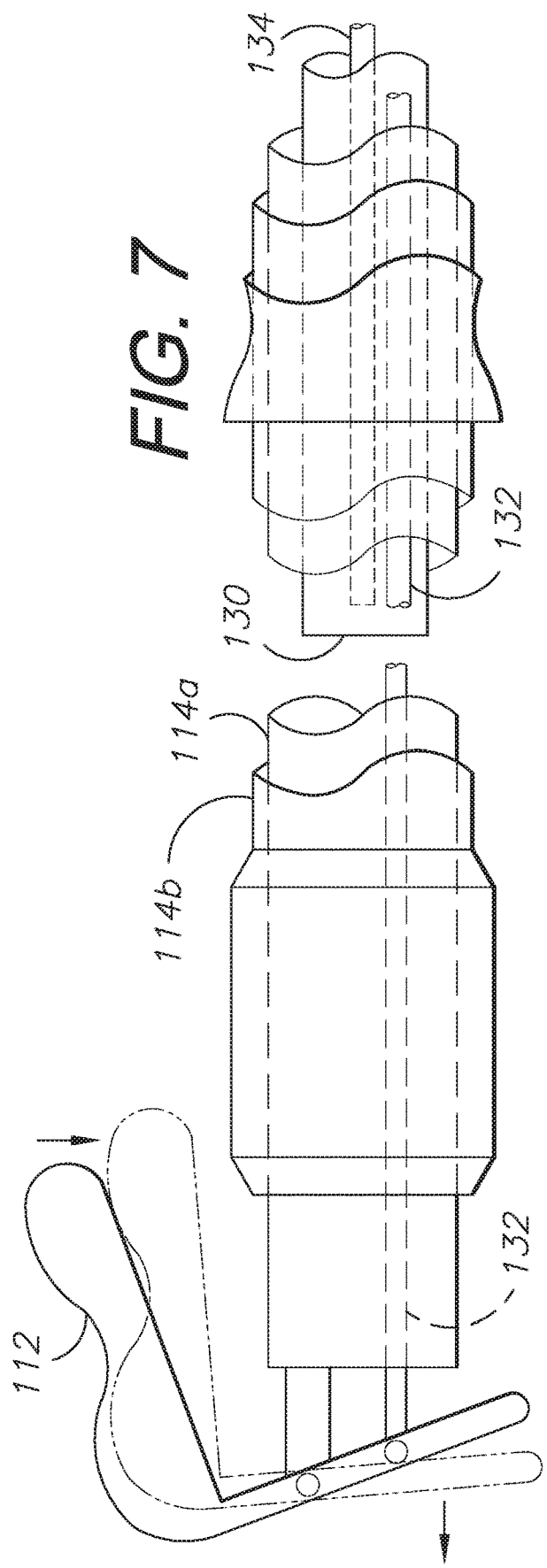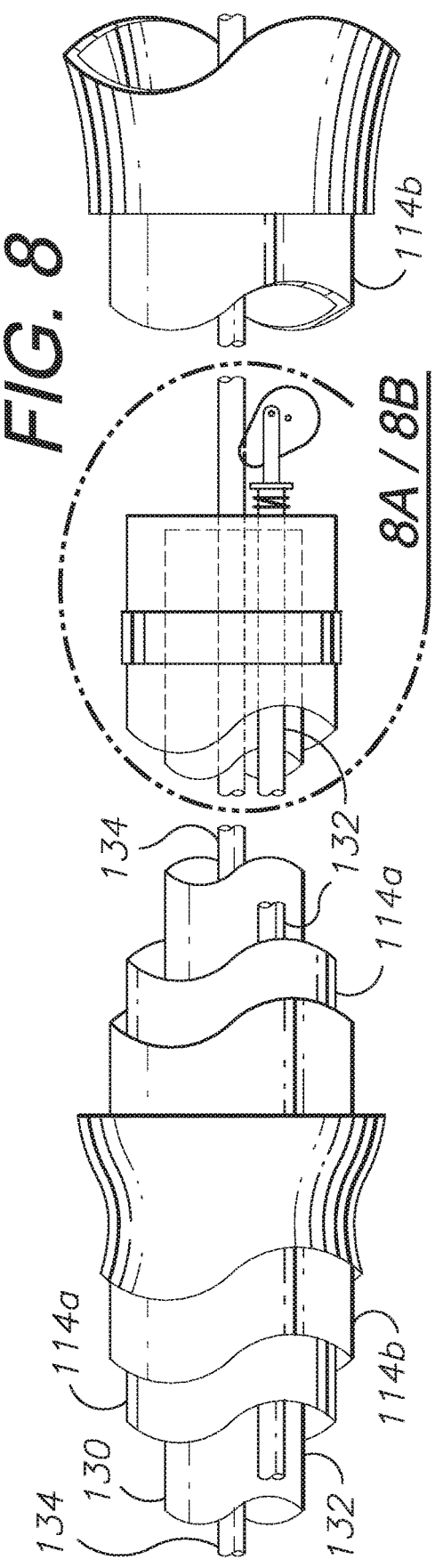

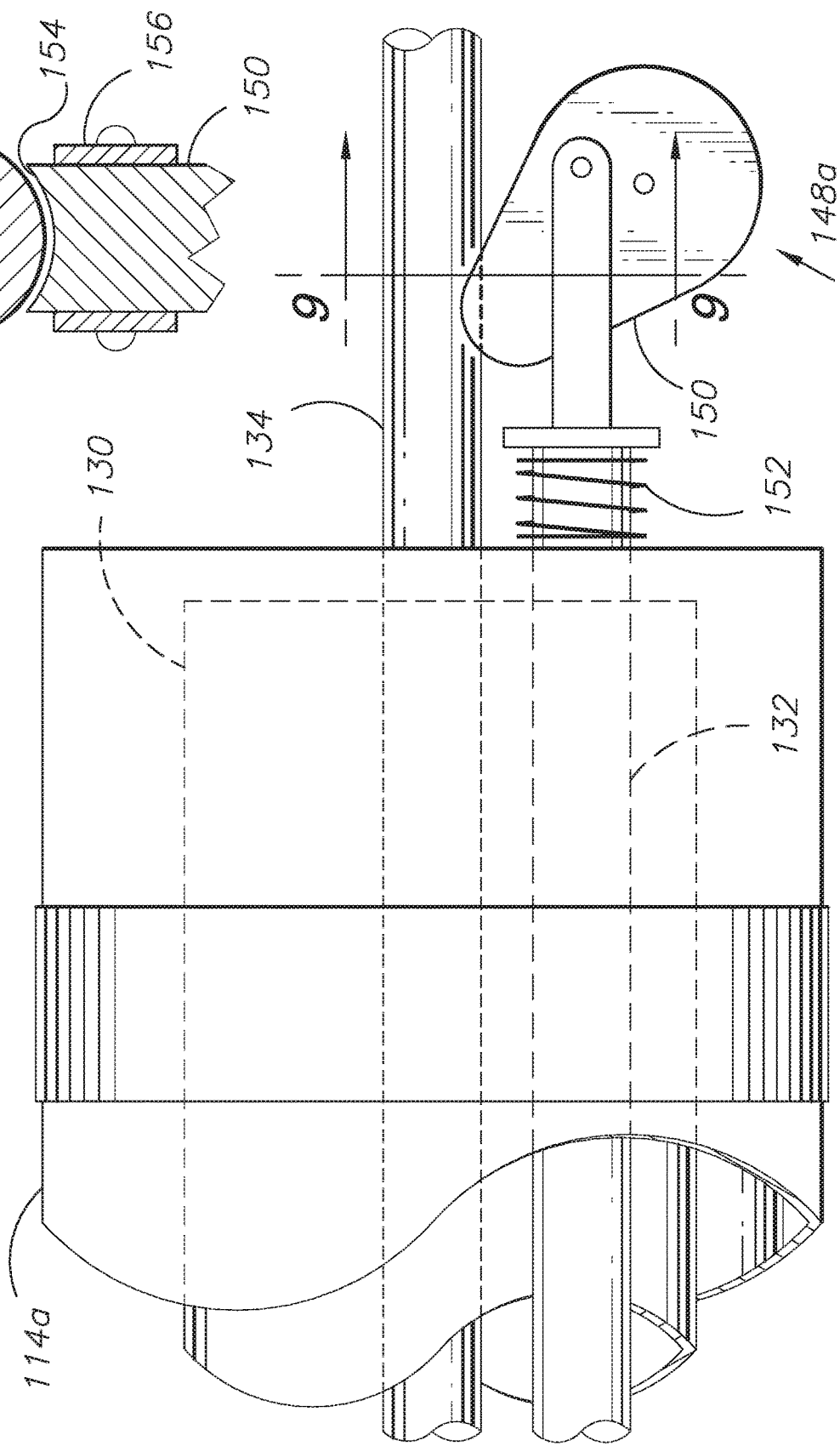

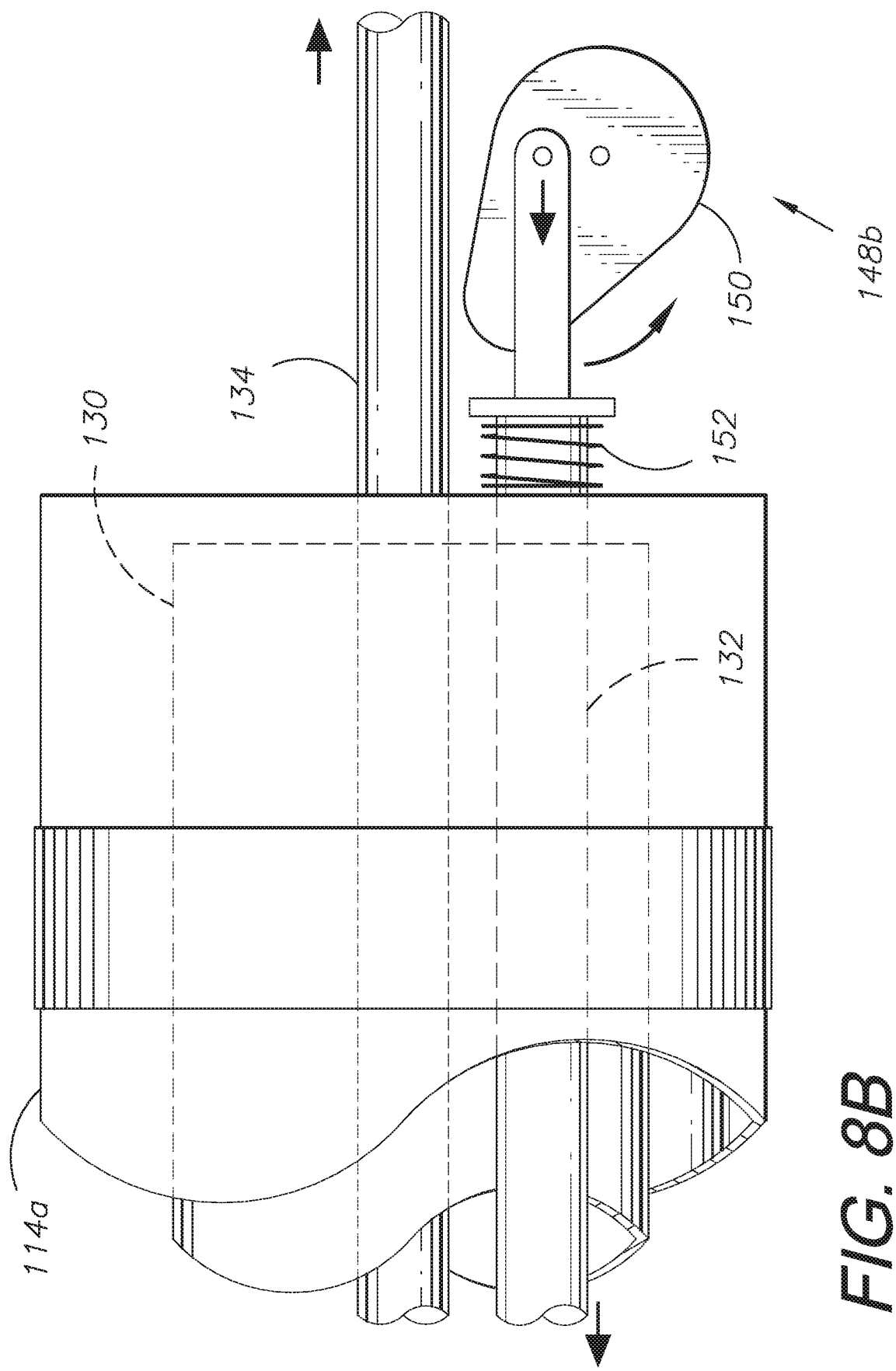

OPEN

OPEN

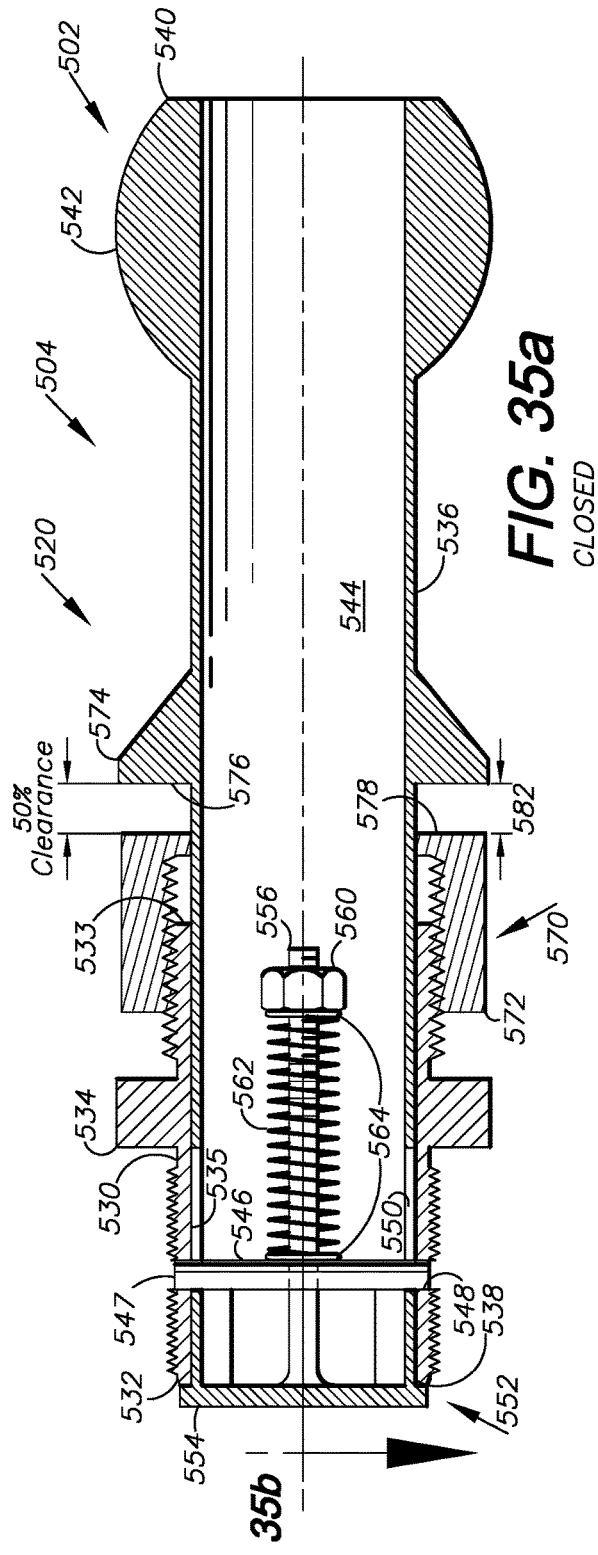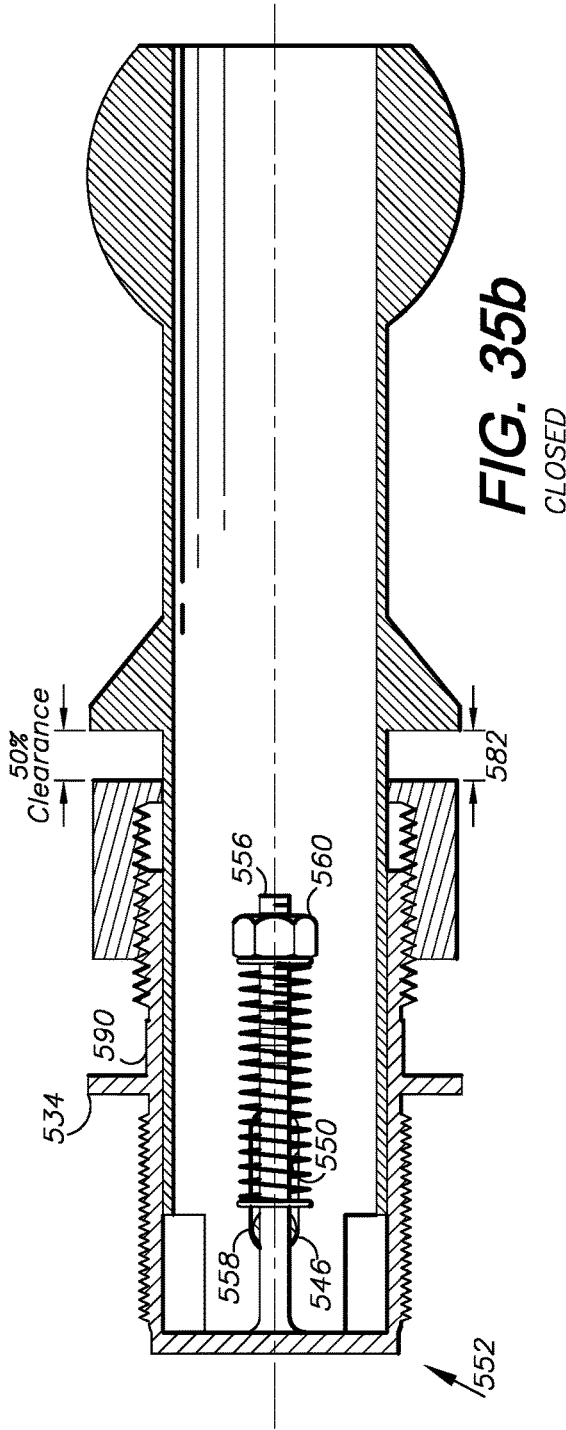

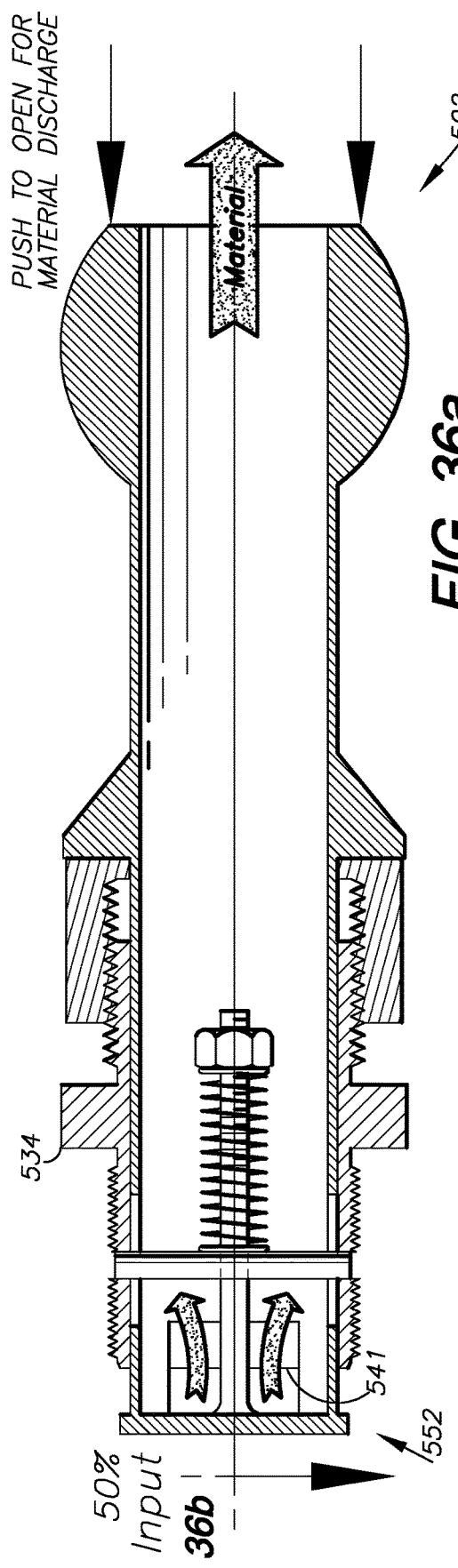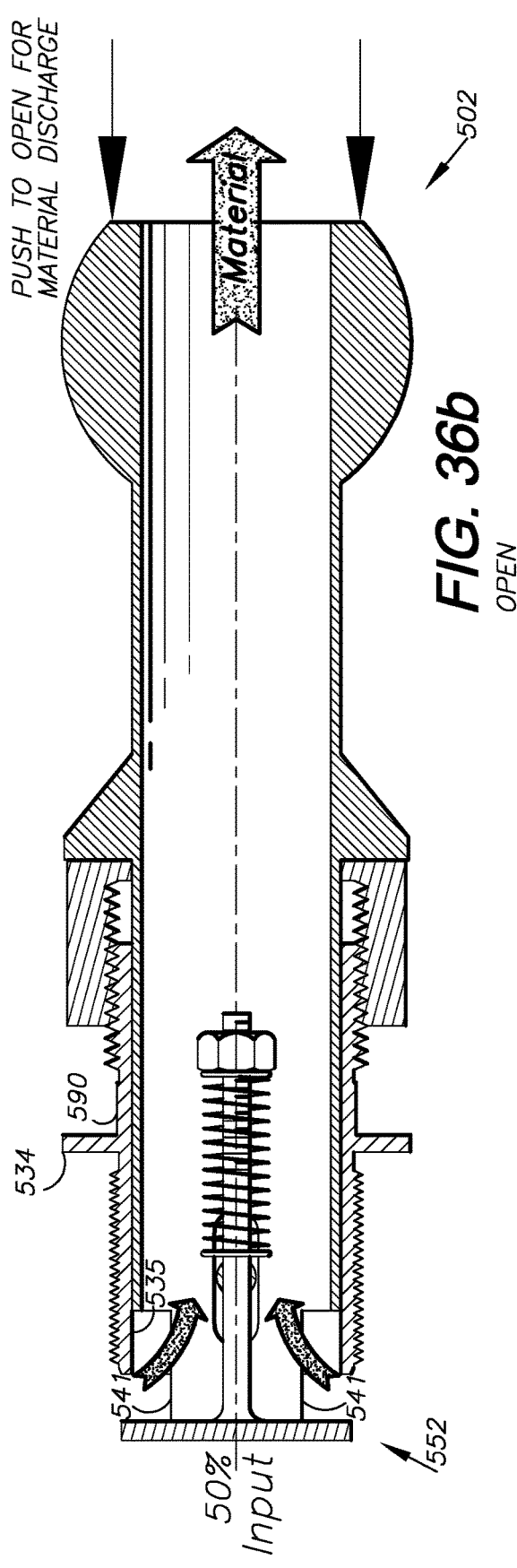

CLOSED

CLOSED

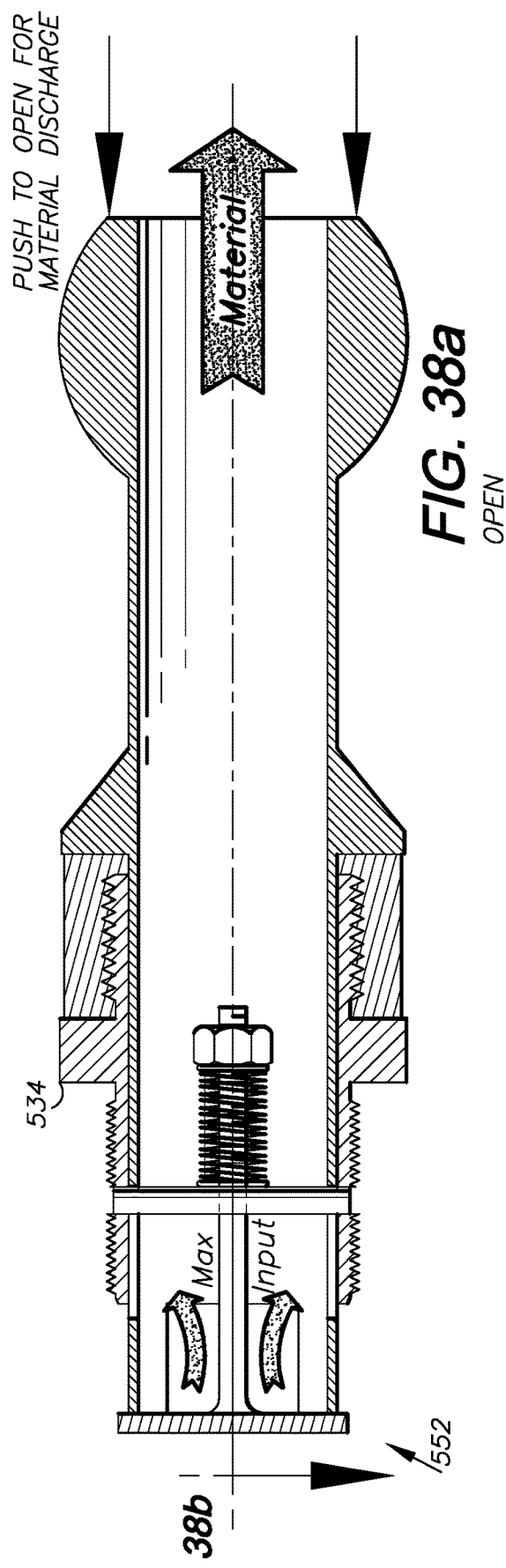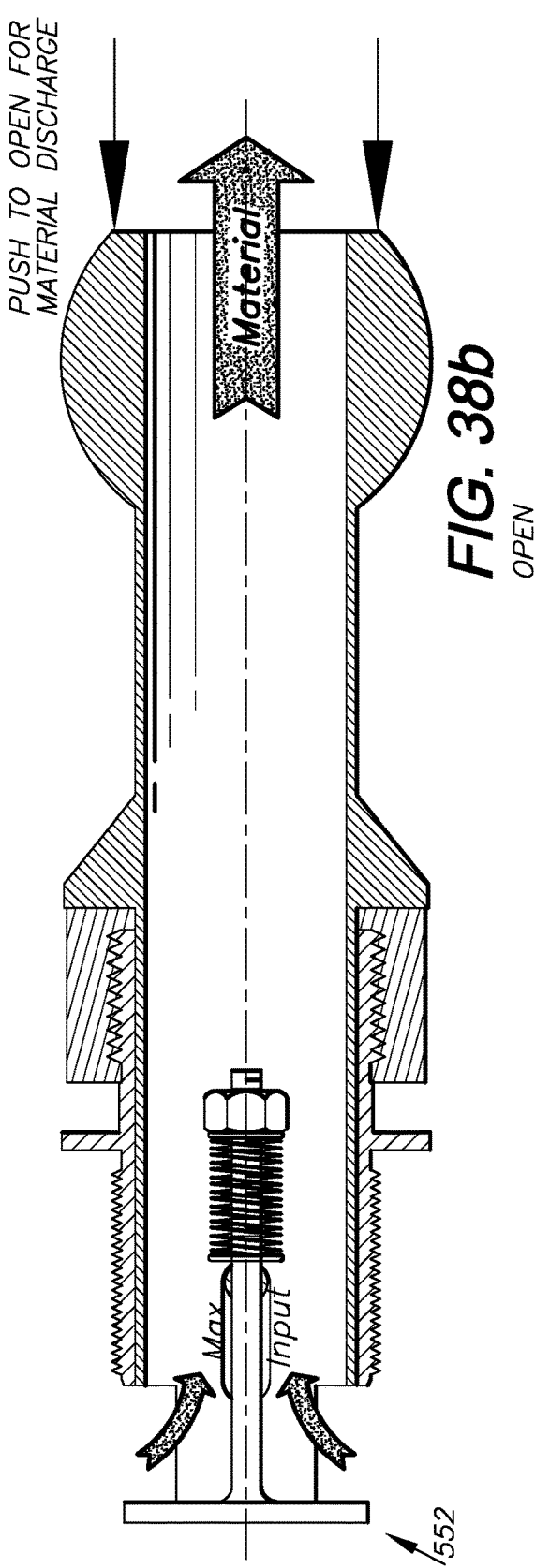

Flow Rate Adjustment

SYSTEM FOR APPLYING FINISHING COMPOUND

CROSS-REFERENCE TO RELATED APPLICATIONS

This application is a continuation-in-part of and claims priority in U.S. patent application Ser. No. 16/045,244, filed Jul. 25, 2018, which is a continuation-in-part of U.S. patent application Ser. No. 15/721,601, filed Sep. 29, 2017, which claims priority in U.S. Provisional Patent Application No. 62/401,579, filed Sep. 29, 2016, which are incorporated herein by reference.

BACKGROUND OF THE INVENTION

1. Field of the Invention

The present invention relates generally to: tools, equipment, and related devices that dispense semi-fluid compounds; procedures for using same; and in particular to an applicator system for finishing drywall and other surfaces.

2. Description of the Related Art

Drywall installation typically involves joining two or more panels or sheets of gypsum board together to create a larger surface, such as a wall or ceiling. This is accomplished by taping the joints and covering the tape with joint compound (or "mud"). Additional applications of mud can be used depending on the specified level of surface finish. Some drywall finishers prefer to apply the mud by hand using putty knives, but this can be a time-consuming process. To semi-automate the process, tool manufacturers have created "flat boxes" comprising reservoirs attached to handles for guiding along gypsum board or drywall joints. The flat boxes apply joint compound, normally over a strip of joint tape, along joints. The joint compound can be sanded and re-coated as necessary to achieve the specified finish level. There are also corner tools and associated reservoirs that apply mud to corner joints. The user applies pressure via a handle assembly to dispense the mud while pushing or pulling such applicators along the drywall joints.

Previous drywall finishing tools include the Continuous Flow Paste Applicator for Dry Wall shown in U.S. Patent Publication No. 2001/0003563, but the connected hoses required by this applicator can be unwieldy. Other prior art finishing systems include components that must be carried around with handle systems, e.g., as shown in U.S. Pat. No. 6,793,428 for Drywall Joint Compound Applicator Appliance, or that continuously dispense compound until a brake is applied, which can lead to the tool dispensing excess compound.

The embodiments of the present invention address prior art deficiencies with systems and methods for applying compound to work surfaces efficiently and effectively. Finishing operations are thus simplified, resulting in higher quality results in less time and with less expense.

Heretofore, there has not been available a surface finishing system with the features and advantages of the present invention.

SUMMARY OF THE INVENTION

In practicing an aspect of the present invention, a system is provided for automatically applying a finishing compound to a surface, e.g., joint compound ("mud"), which can be applied over joint tape to form a flush or level drywall joint. Modified or alternative aspects of the invention include lockable gas springs, piston-and-cylinder units, and drive augers for dispensing the compound from a handle assembly, which can be held by an operator. Power can be applied via compressed springs extending a plunger or electric motors rotating an auger. Various application-specific finishing tools, such as mud knives for flat surfaces and corner tools (e.g., for wall-ceiling and wall-wall intersections), can be mounted on the handle assembly. In practicing another aspect of the present invention, a finishing compound applicator includes a dispensing valve activated by engaging the applicator with a wall surface, whereupon compound is automatically dispensed under pressure until the applicator disengages. In this embodiment the operator merely loads or charges the applicator with compound, engages the work surface (e.g., a wall and/or ceiling), and disengages to halt compound flow. In another aspect of the present invention, the dispensing valve further includes an adjustment mechanism configured to accommodate adjustment of finishing compound flow through the dispensing valve when the applicator is engaged against the work surface.

BRIEF DESCRIPTION OF THE DRAWINGS

The drawings constitute a part of this specification and include exemplary embodiments of the present invention illustrating various objects and features thereof:

FIG. 2 is an enlarged, fragmentary view thereof, taken generally within area 2 in FIG. 1.

FIG. 3 is an enlarged, fragmentary view of a locking mechanism thereof, taken generally within area 3 in FIG. 1.

FIG. 7 is an enlarged, fragmentary view thereof, taken generally within area 7 in FIG. 6.

FIG. 8 is an enlarged, fragmentary view thereof, taking generally within area 8 in FIG. 6 and showing a cam-actuated locking mechanism for a pushrod thereof.

FIGS. 8A and 8B show the locking mechanism in locked and unlocked positions, respectively.

FIG. 9 is a cross-sectional view thereof taken generally along line 9-9 in FIG. 8A and particularly showing a cam surface engagement with a slave rod.

FIGS. 35a and 35b are cross-sectional views of an alternative push-to-open valve assembly of a push-to-dispense finishing material application system embodying the present invention having a flow adjustment mechanism, with the flow adjustment mechanism set for approximately 50 percent finishing material flow and the valve assembly in closed position.

FIGS. 36a and 36b are cross-sectional views of the alternative push-to-open valve assembly, with the flow adjustment mechanism set for approximately 50 percent finishing material flow and the valve assembly in open position.

FIGS. 38a and 38b are cross-sectional views of the alternative push-to-open valve assembly, with the flow adjustment mechanism set for maximum finishing material flow and the valve assembly in open position.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of movement, if appropriate. Said terminology will include the words specifically mentioned, derivatives thereof and words of similar meaning.

II. First Modified Embodiment or Alternative Aspect of the Invention (FIGS. 1-5)

Figure 5:
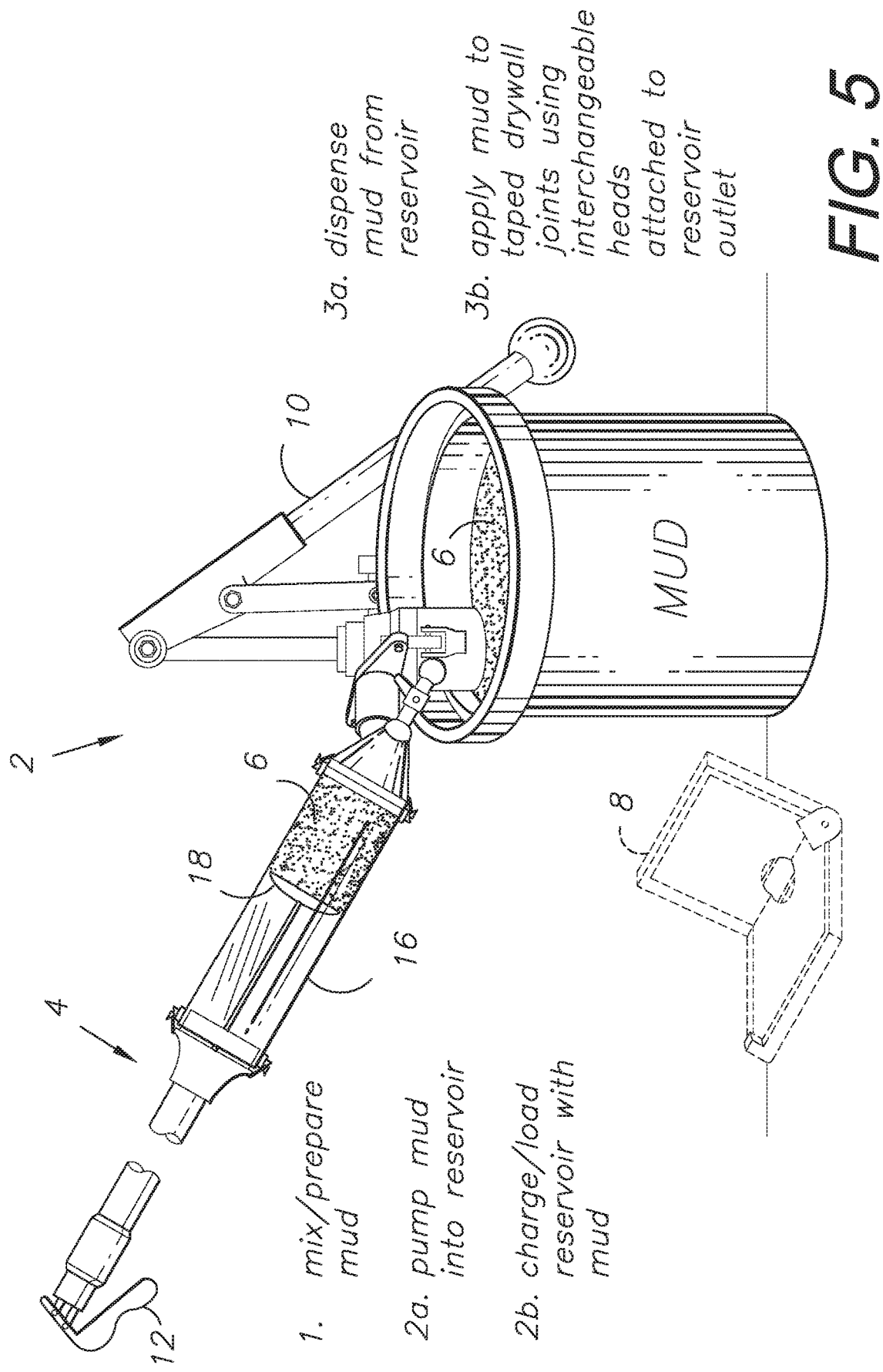
FIG. 5 shows the finishing system, including a dispensing tool thereof, a container of compound, a compound pump and a corner application attachment.
Figure 6:
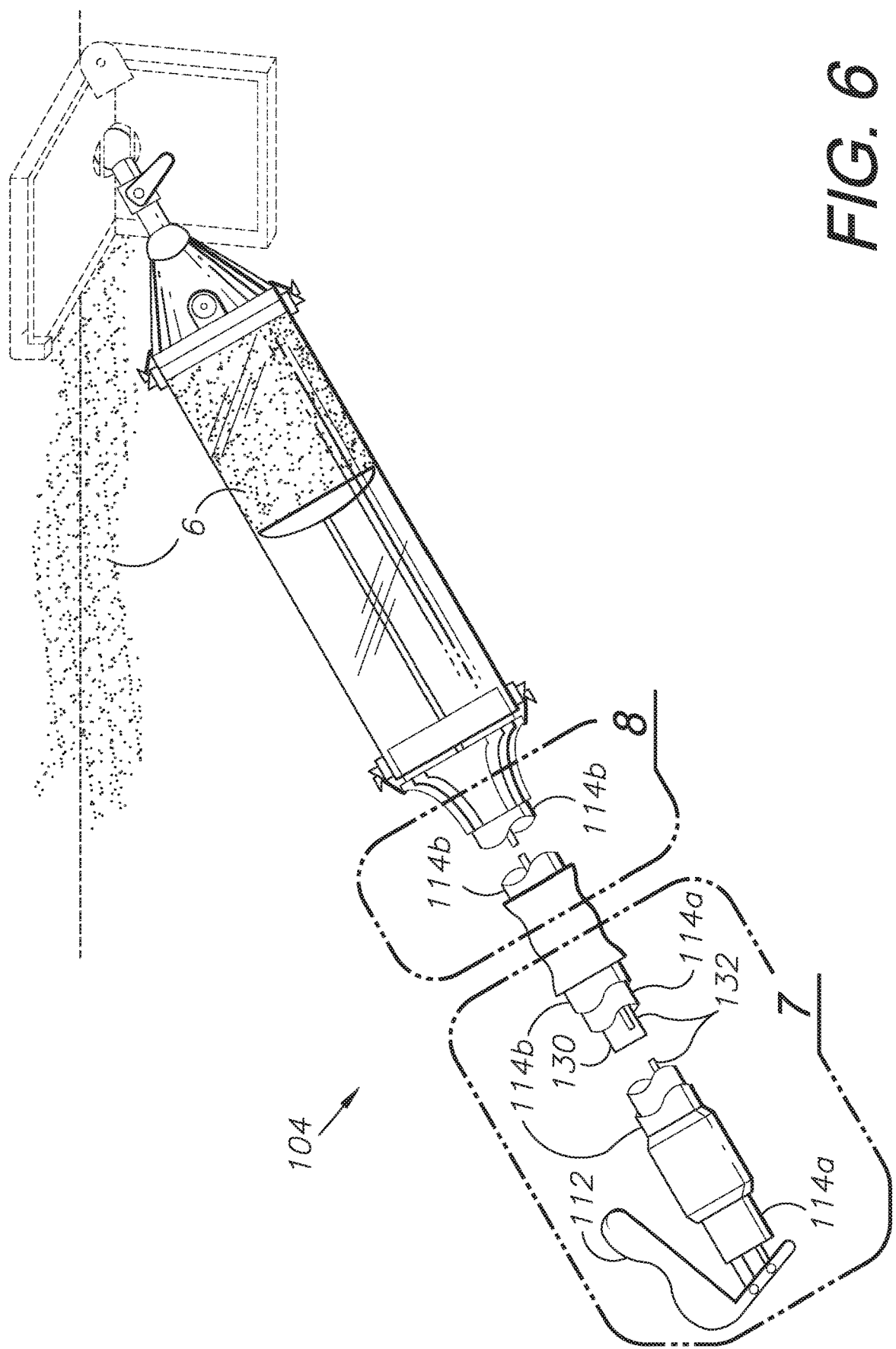
FIG. 6 shows a surface finishing system comprising an alternative or modified aspect of the present invention, shown in use finishing a ceiling-wall joint.
Figure 10:
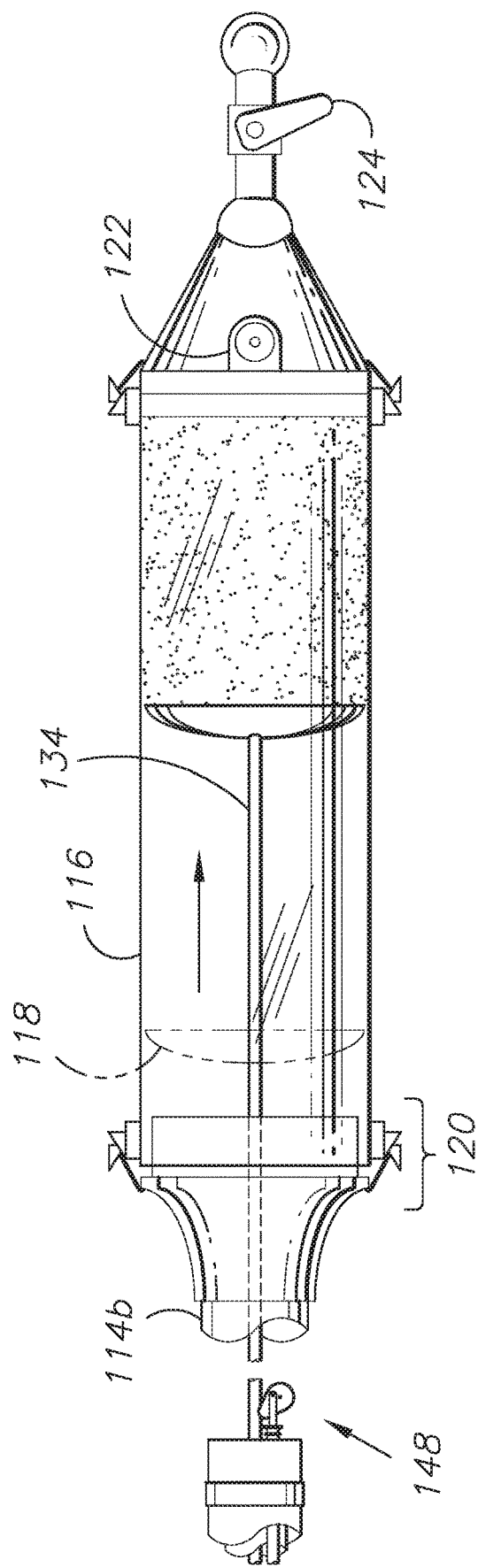
FIG. 10 is an enlarged, fragmentary, elevational view thereof.
Figure 11:
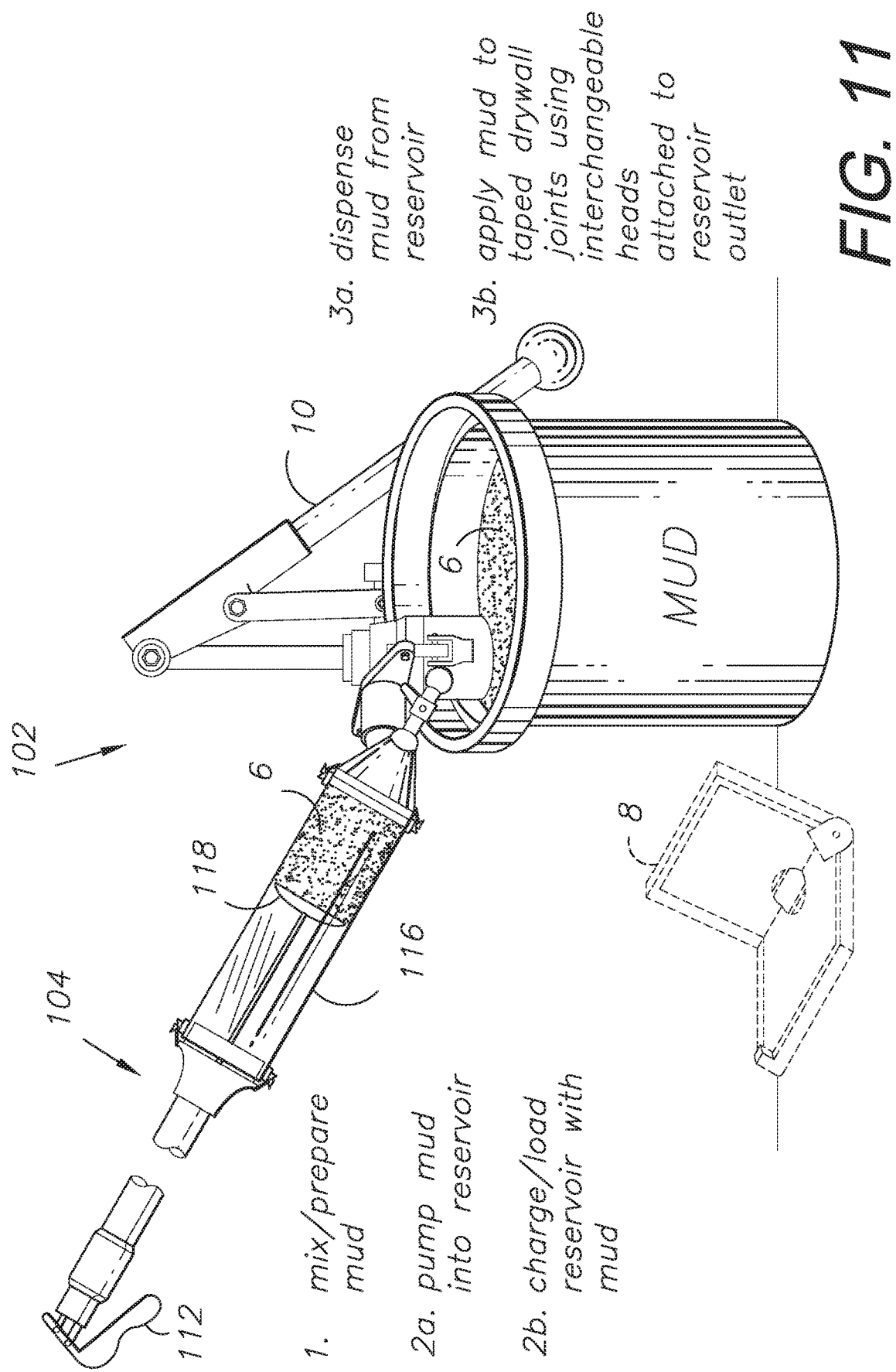
FIG. 11 shows the dispensing tool with a container of compound material, a corner-finishing attachment and a compound pump.
Figure 12:
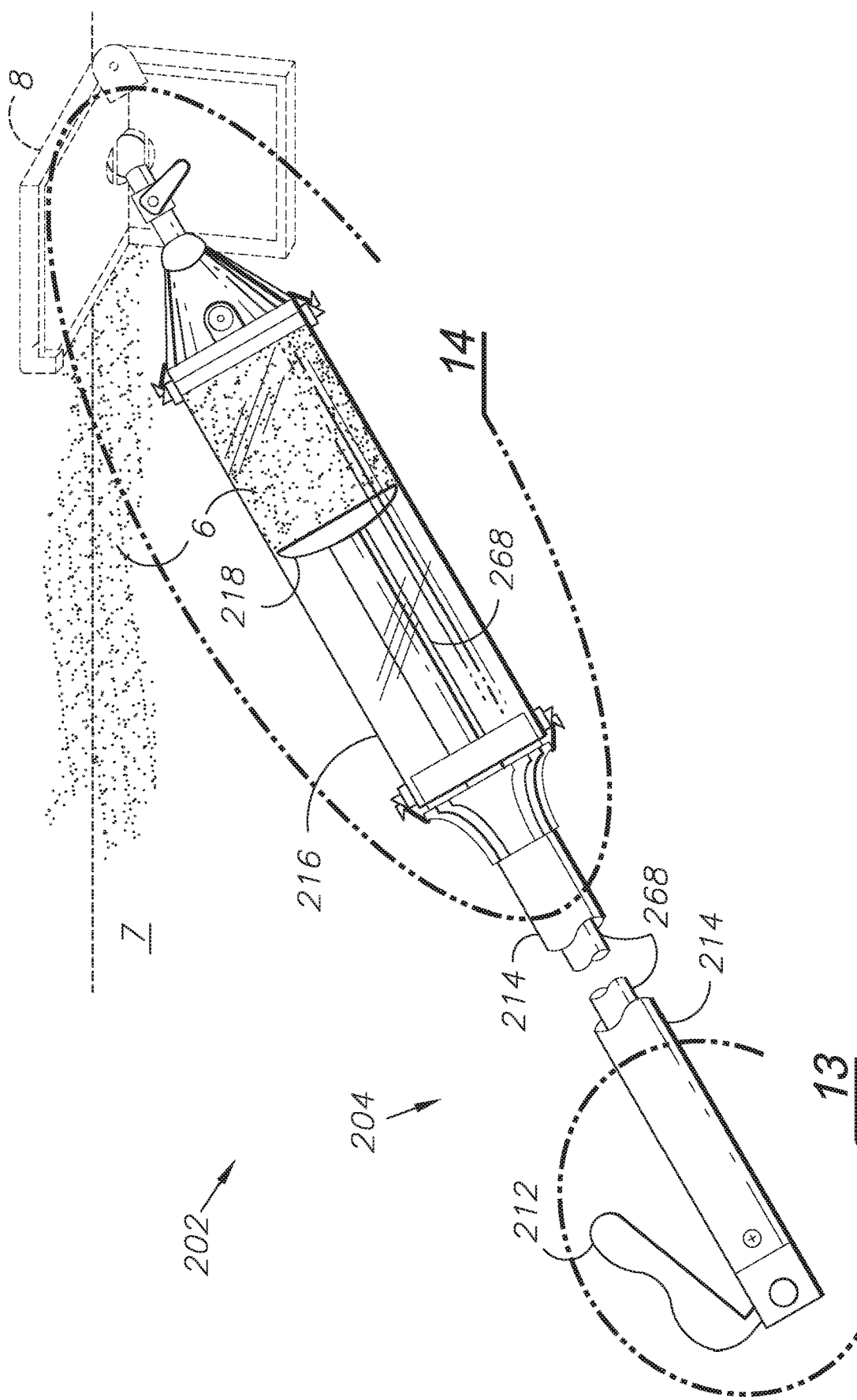
FIG. 12 shows a compound dispensing tool comprising another alternative or modified embodiment of the present invention, shown in use applying compound material to a wall-ceiling joint.

Referring to FIGS. 1-5, a compound application or surface finishing system 2 employs a compound-dispensing tool 4 to apply a quantity of material 6, such as drywall finishing compound or "mud", to some other material or surface 7, such as taped drywall joints. The compound 6 can be applied using a removable, interchangeable application tool 8 (e.g., a drywall compound distribution box) attached to a reservoir 16 outlet, said reservoir 16 capable of containing an amount of compound 6. In an embodiment of the application system 2 a pump 10 is used to move compound 6 from a source (e.g., a finishing compound bucket as shown in FIG. 5) and into the reservoir 16 via a fill access port 22 for reloading or recharging the reservoir 16 as the material 6 is applied and used. A plunger 18 can be employed to push and dispense the material 6 out of the reservoir 16. An embodiment of the invention can also include a ball throttle valve 24 to control dispensing the compound 6 from the reservoir 16. Part of the compound-dispensing assembly 4 of the invention can also include one or more openable clamp assemblies 20 for ease of removing the reservoir from a handle 14 in order to access, open, or dismantle the assembled tool for cleaning, storage, or for any other reason.

A handle 14 can extend the distance between a user and the intended application surface 7. Various embodiments of certain features of the invention can also be mounted onto or in the handle 14.

The extendable-retractable handle 14 can include one or more sections 14a, 14b, etc., which can telescope with respect to each other. A pressurized cylinder 30 can be mounted in the handle 14 for dispensing a quantity of material 6, such as drywall finishing compound or "mud."

A tool assembly 4 includes a release lever 12, which is actuated by squeezing the lever 12 towards the body of the handle 14, thereby retracting a master rod 32 which rotates a first embodiment braking mechanism 38 (in this case, a pinch brake 40) thereby releasing a slave rod 34 which is a piston of the pressurized cylinder 30. The piston 34 is connected to the reservoir plunger 18. With the release lever 12 depressed, gas and/or spring pressure within the cylinder 30 pushes the slave rod 34 outwardly for continuous compound 6 dispensing until the release lever 12 is released or the handle reservoir 16 requires recharging with compound material 6.

Figure 1:
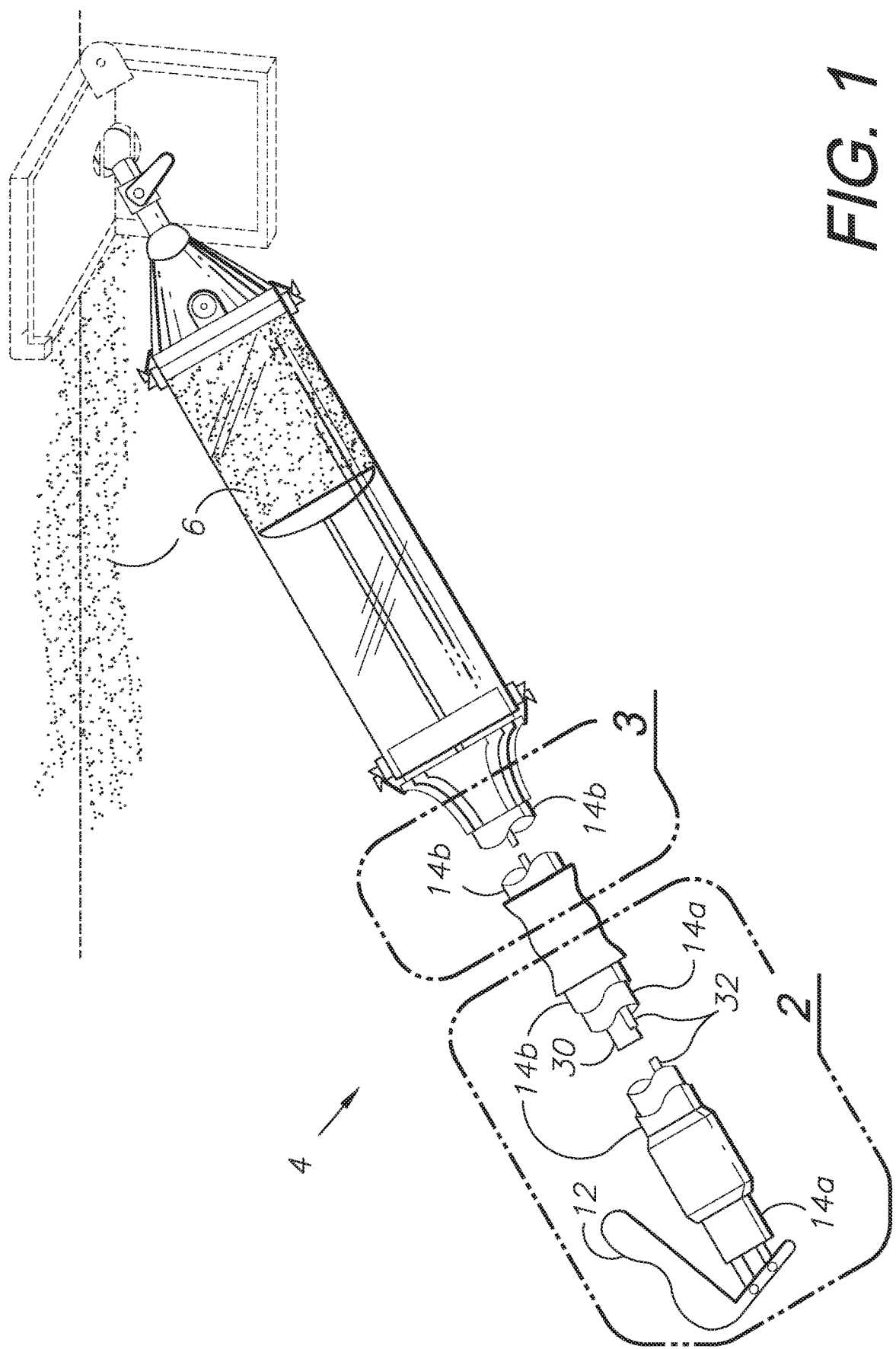
FIG. 1 shows a finishing compound dispensing system comprising an aspect of the present invention, shown in use applying finishing compound to a wall-ceiling joint.
Figure 3A:
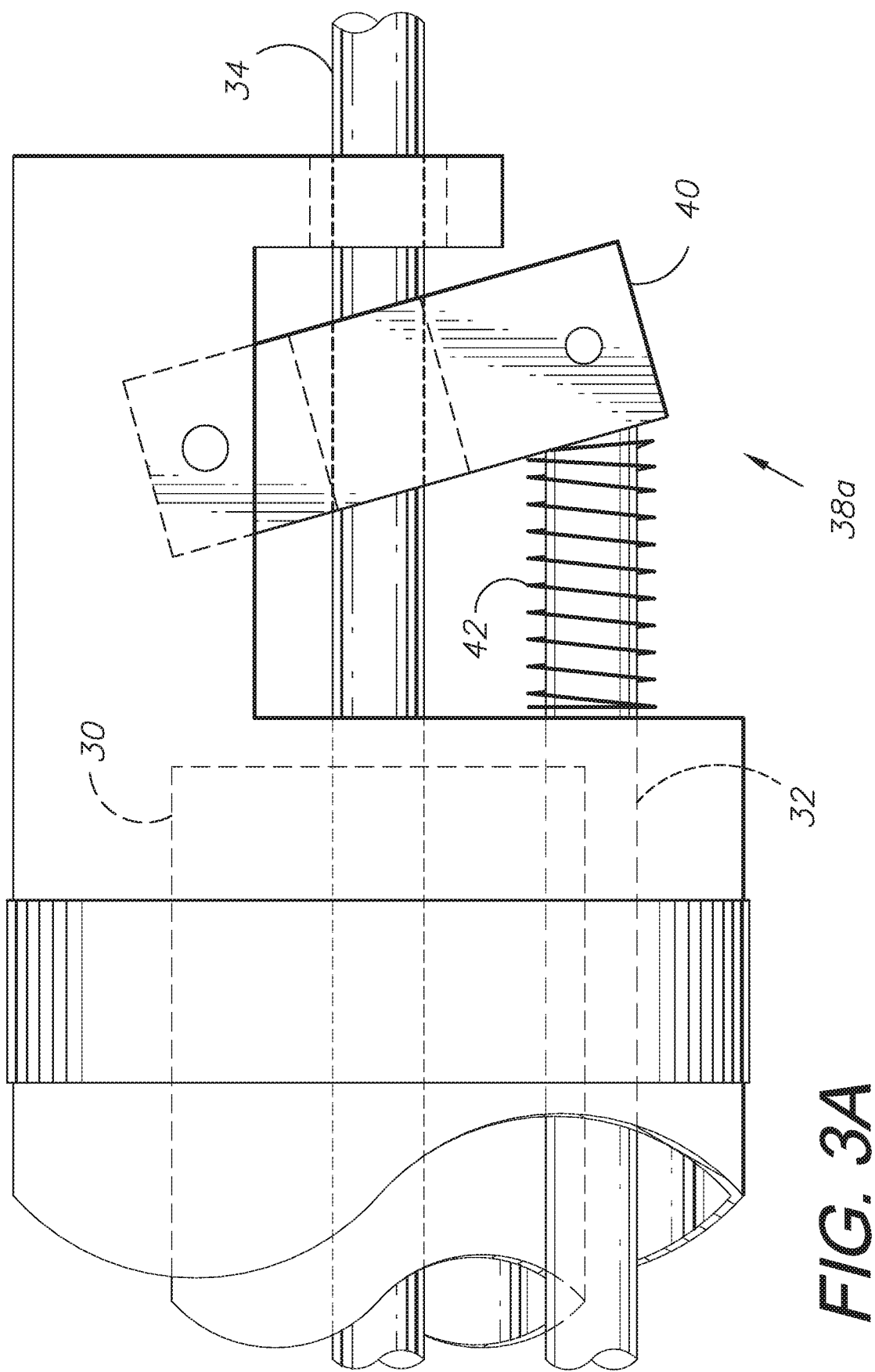
FIGS. 3A and 3B show the locking mechanism in locked and unlocked positions, respectively.
Figure 3B:
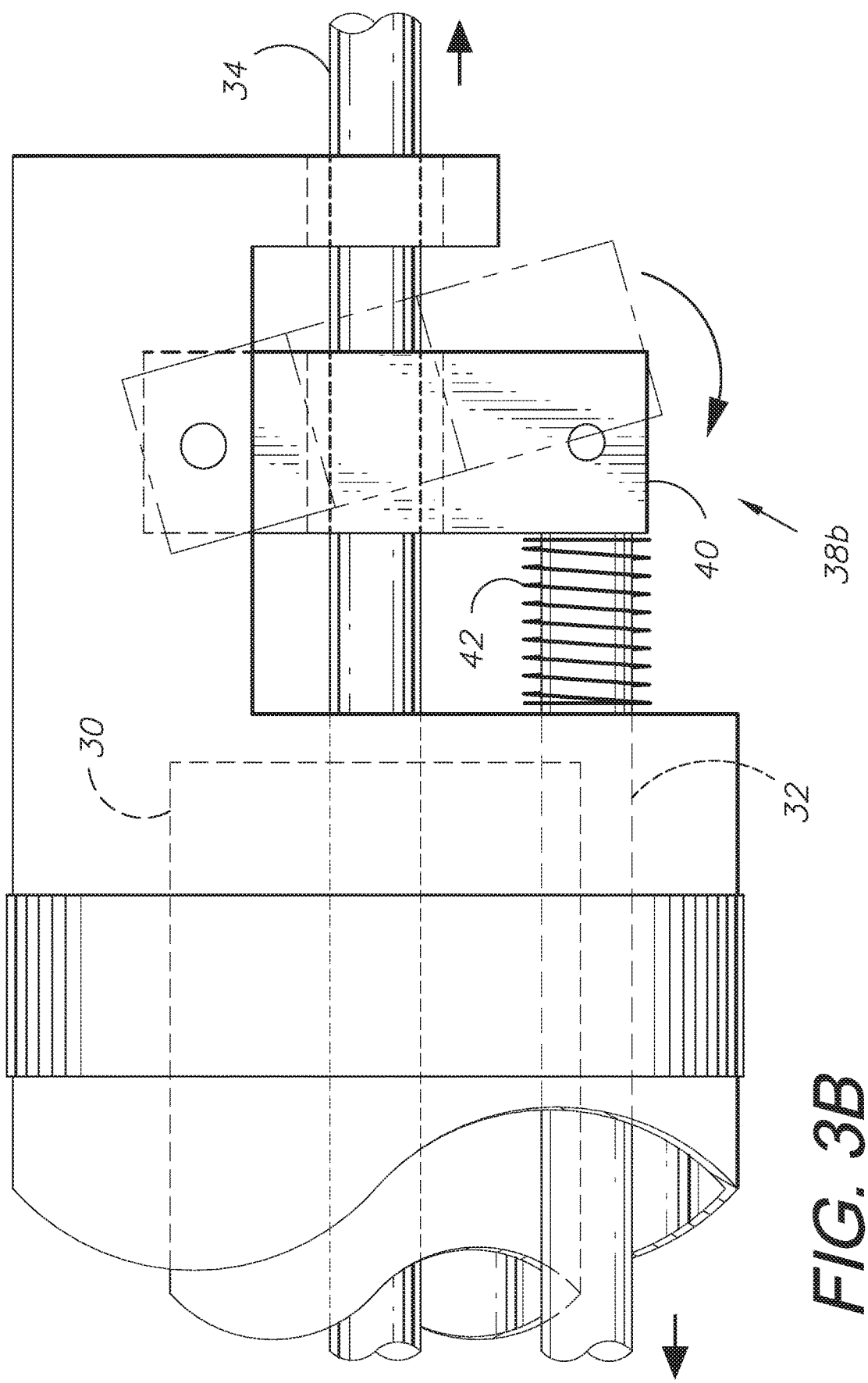
Figure 4:
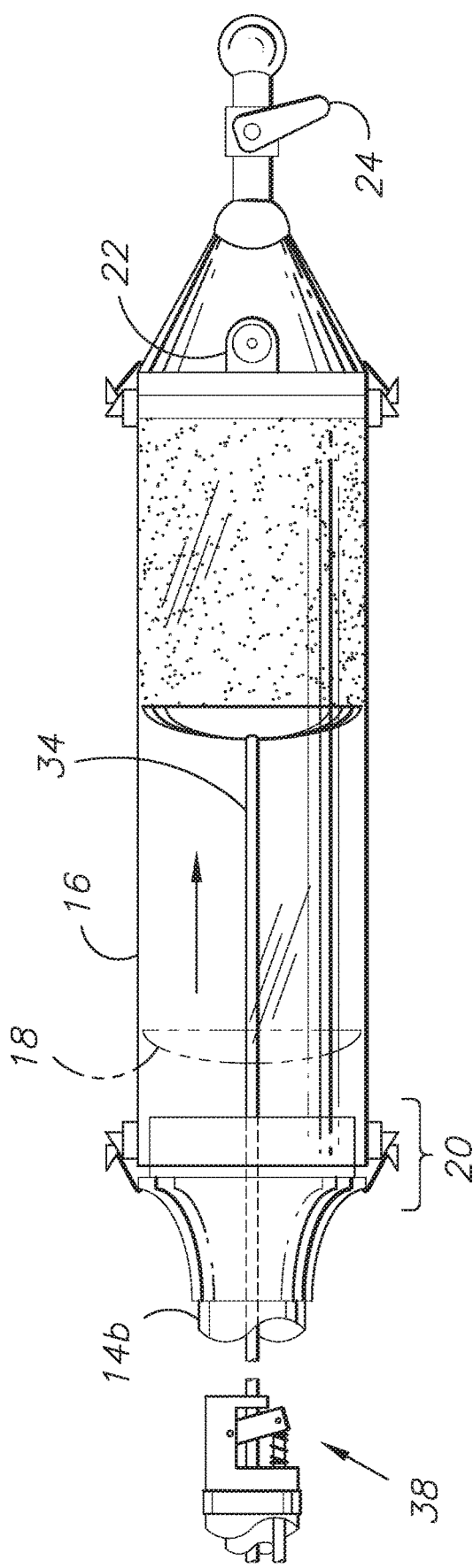
FIG. 4 is a side elevational view thereof, with portions broken away to reveal internal construction.

Upon releasing the lever 12, a first embodiment brake compression spring 42 (compressed with the retracted master rod 32) expands and extends the master rod 32, rotating the pinch brake 40 of the braking mechanism 38 in the opposite direction, thereby braking the outward motion of the slave rod 34. FIGS. 3, 3A, and 3B respectively show locked and unlocked positions 38a, 38b of the braking mechanism 38.

Reversing the direction of the slave rod 34 follows a sequence similar to that of the standard use sequence: squeezing the lever 12 retracts the master rod 32, which rotates the braking mechanism 38, thereby releasing the slave rod 34, at which point inward pressure on the opposite end of the piston 34 would re-pressurize the gas and/or spring pressure within the cylinder 30 with the slave rod 34 returned to its initial position, ready for the process to be repeated, and for recharging or reloading the reservoir 16 with drywall compound 6.

FIG. 5 shows the system 2 in a charging or loading procedure with joint compound 6 being loaded into the reservoir 16 using the pump 10, which can be placed in a bucket or other container of joint (drywall) compound. The compound 6 is pumped into the reservoir 16 through the inlet access port 22.

III. Second Modified Embodiment or Alternative Aspect of the Invention (FIGS. 6-11)

A second embodiment or aspect of the invention comprising a system designated 102 with a compound-dispensing tool 104 incorporates the use of a cam 150 in place of a pinch brake 40 and is shown in FIGS. 6-11. The cam 150 can include a groove 154 to increase surface contact between the cam 150 and a slave rod 134, thereby increasing friction and reducing the force necessary to brake the motion of the slave rod 134. A master rod 132 can attach to the cam 150 by means of a clevis assembly 156 that accommodates rotation of the cam 150.

Similar to the operation of the previous embodiment, upon releasing a release lever 112, a second embodiment brake compression spring 152 squeezed by a retracted master rod 132 is allowed to expand, thereby extending the master rod 132, rotating the cam 150 of a braking mechanism 148 (in this case, a cam brake) in the opposite direction, thereby braking the outward motion of the slave rod 134. FIGS. 8A and 8B respectively show a locked position 148a and an unlocked position 148b of the braking mechanism 148.

The handle 114 can include one or more sections 114a, 114b, etc. and can be connected to a source of the compound 6 for reloading or recharging a reservoir 116 as the material 6 is applied and used. A reservoir plunger 118 can be mounted to the end of the slave rod 134 to ease dispensing. Alternative arrangements for locking and releasing the piston rod 134 of a piston 134 and cylinder 130 unit are provided. These can include, without limitation, rotatable plates, cams, and other braking mechanisms. A non-limiting example of an application for the extendable handle 114 is a drywall finishing tool 104 mounting a drywall compound (mud) distribution box 8, as well as various other taping, sanding, painting, and finishing tools and equipment.

The system 102 can, similarly to the previous embodiment, incorporate a fill access port 122, a ball valve throttle 124, and one or more openable clamp assemblies 120 to simplify use.

IV. Third Modified Embodiment or Alternative Aspect of the Invention (FIGS. 12-18)

A third embodiment or aspect of the invention (FIGS. 12-18) comprising a system designated 202 with a compound-dispensing assembled tool 204 incorporates the use of a locking, pressurized gas cylinder 268 unit (such as those manufactured by Bansbach Easylift of Lorch, Germany, for example) actuated by a release pin 264 pressed by a projection 262 of a release lever or trigger mechanism 212. Squeezing the release lever 212 (also referred to as a "trigger") toward the body of a handle 214 causes the projection 262 on the trigger mechanism 212 to depress the release pin 264 of a piston rod 266 of the locking, pressurized gas cylinder 268, thereby unlocking it. With the cylinder 268 unlocked the piston rod 266 extends and the tool dispenses compound 6 until the trigger 212 is released or the handle reservoir 216 requires recharging with compound material 6. A plunger 218 within the reservoir 216 is mounted on the end of the cylinder 268.

Upon release of the trigger 212, the release pin 264 is no longer depressed and the locking, pressurized gas cylinder 268 locks, thereby braking the outward motion of the plunger 218.

Reversing the direction of the cylinder 268 follows a sequence similar to that of the standard use sequence: squeezing the trigger 212 depresses the release pin 264, thereby unlocking the pressurized cylinder 268, at which point inward (retracting) pressure on the opposite end of the cylinder 268 would re-pressurize the gas pressure within the cylinder 268 and return the cylinder 268 to its initial position relative to the piston rod 266, ready for the process to be repeated.

Figure 13:
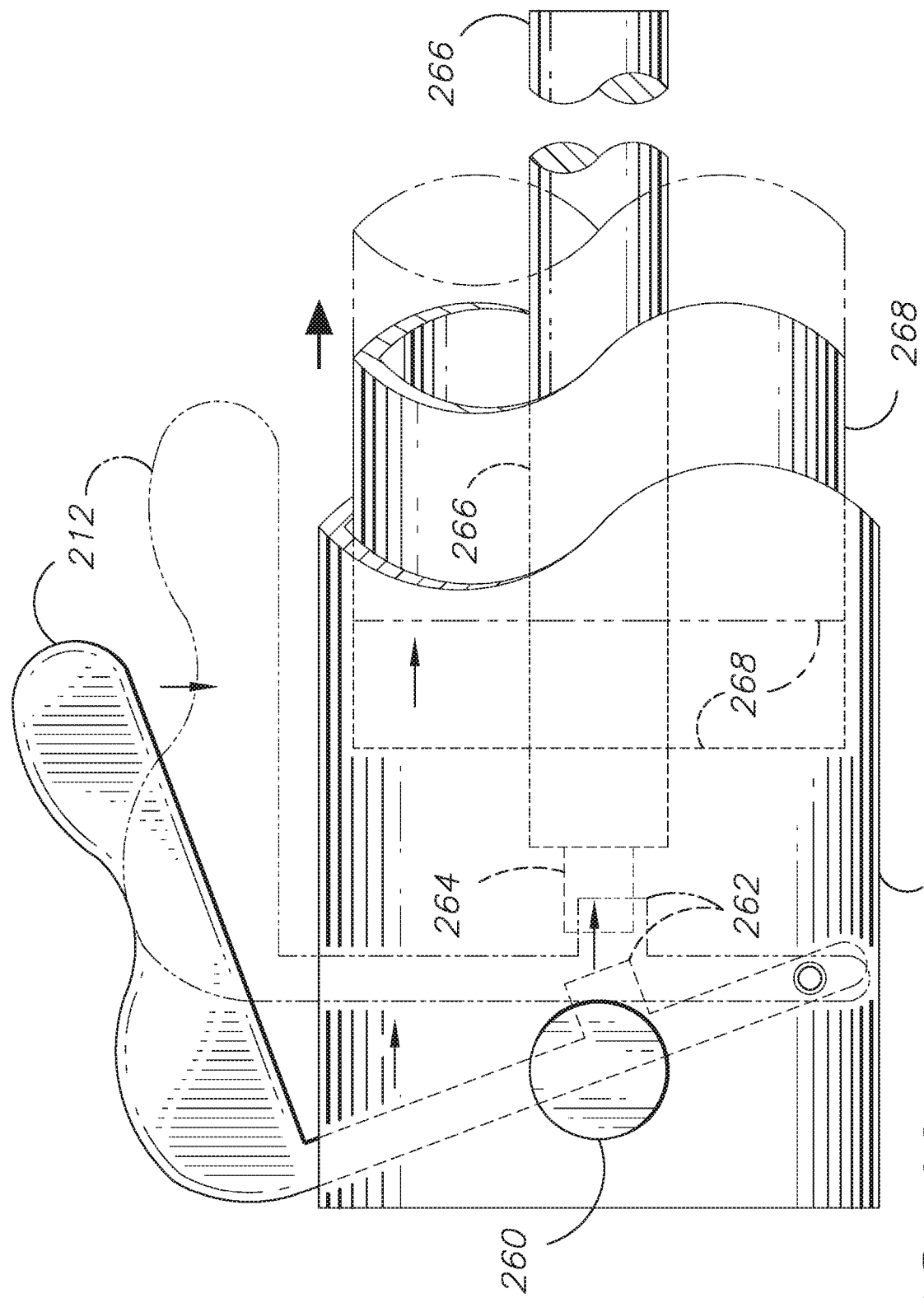
FIG. 13 is an enlarged, fragmentary view thereof, taken generally in area 13 in FIG. 12, and particularly showing an actuating handle and actuating mechanism.
Figure 13B:
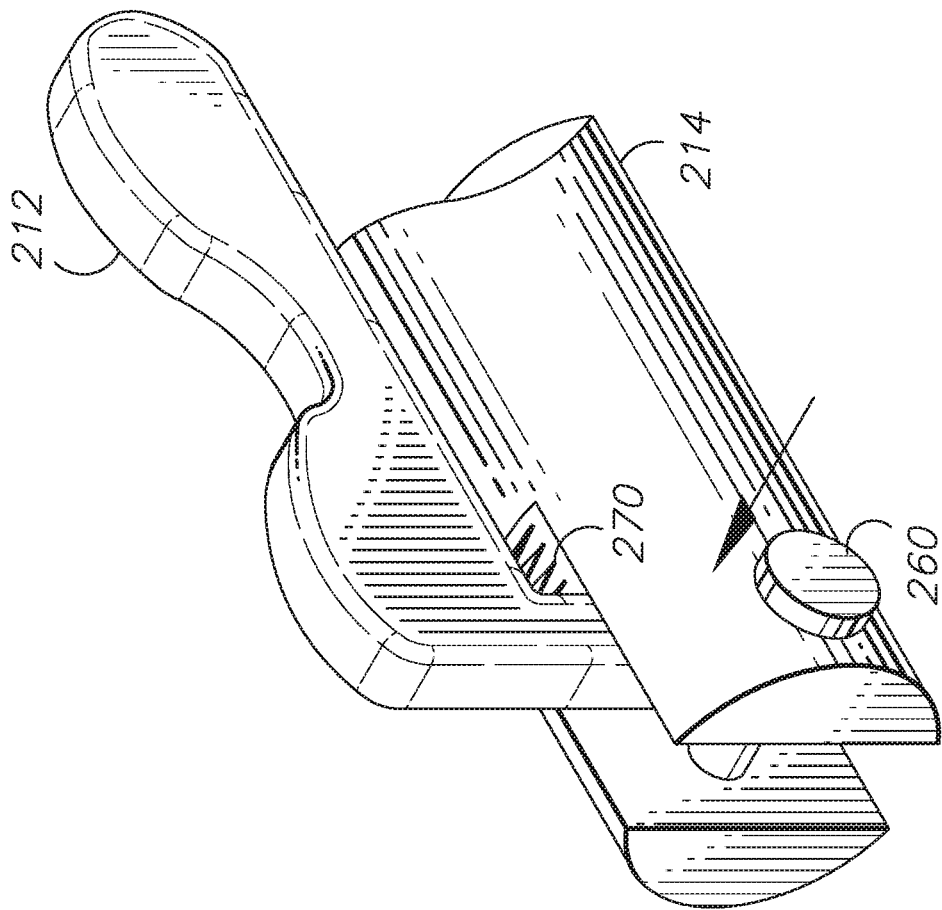
FIGS. 13A and 13B are fragmentary, perspective views of a release lever locking mechanism of the invention, shown in unlocked and locked positions, respectively.
Figure 13A:
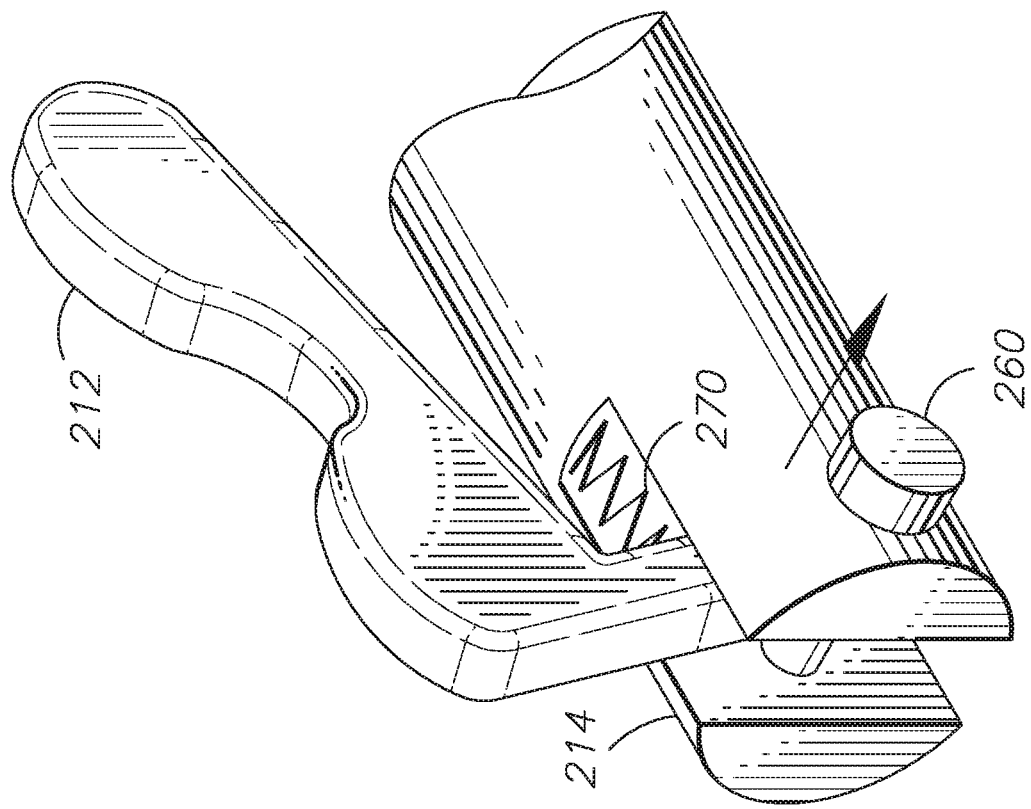
Figure 14:
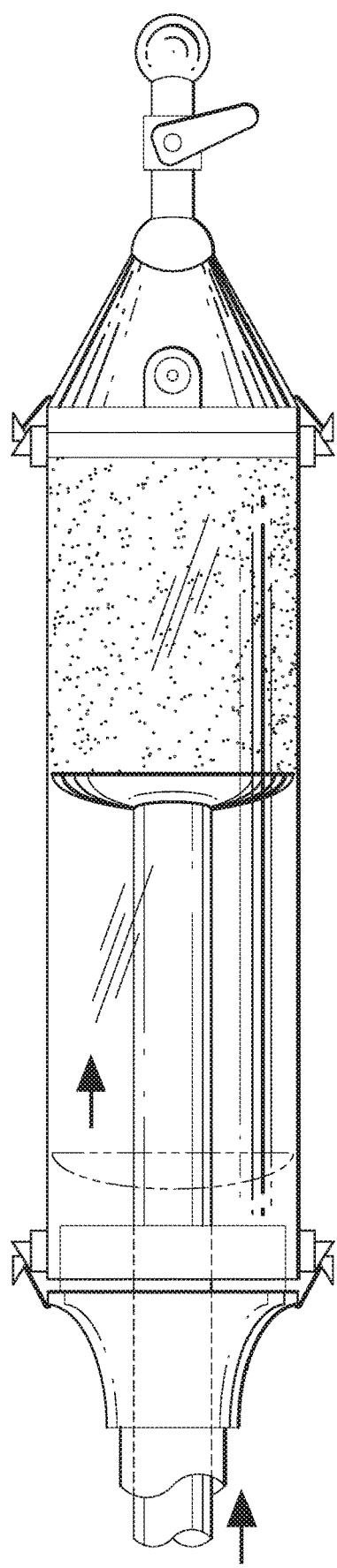
FIG. 14 is an enlarged, fragmentary view thereof, taken generally in area 14 in FIG. 12.
Figure 15:
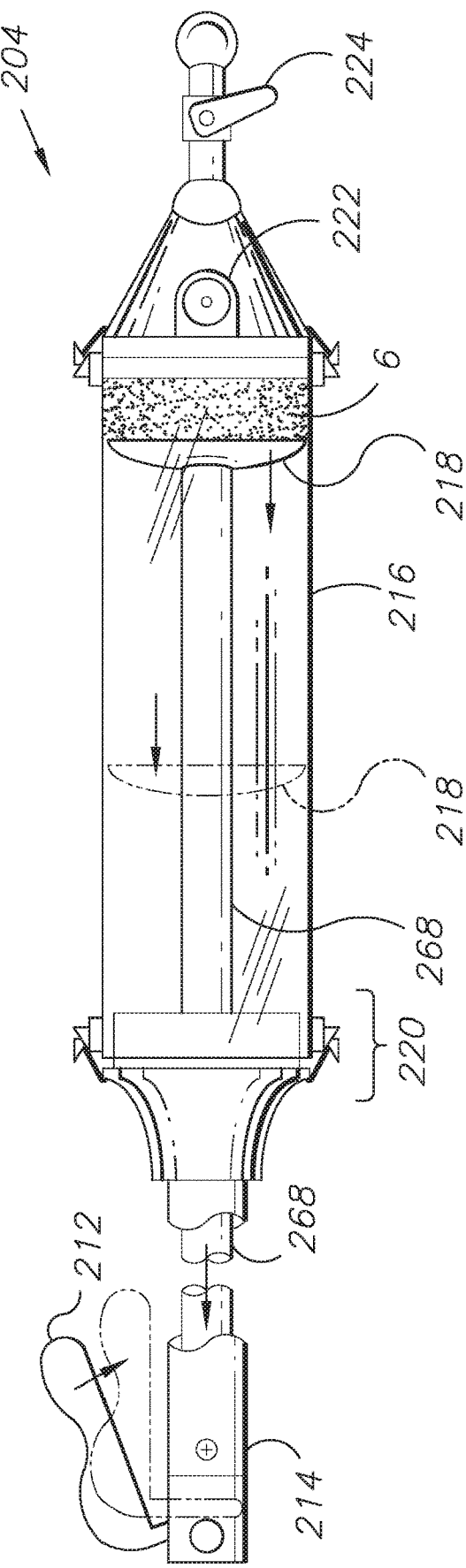
FIG. 15 is an elevational view thereof with a description of a procedure for charging the device with compound material.
Figure 16:
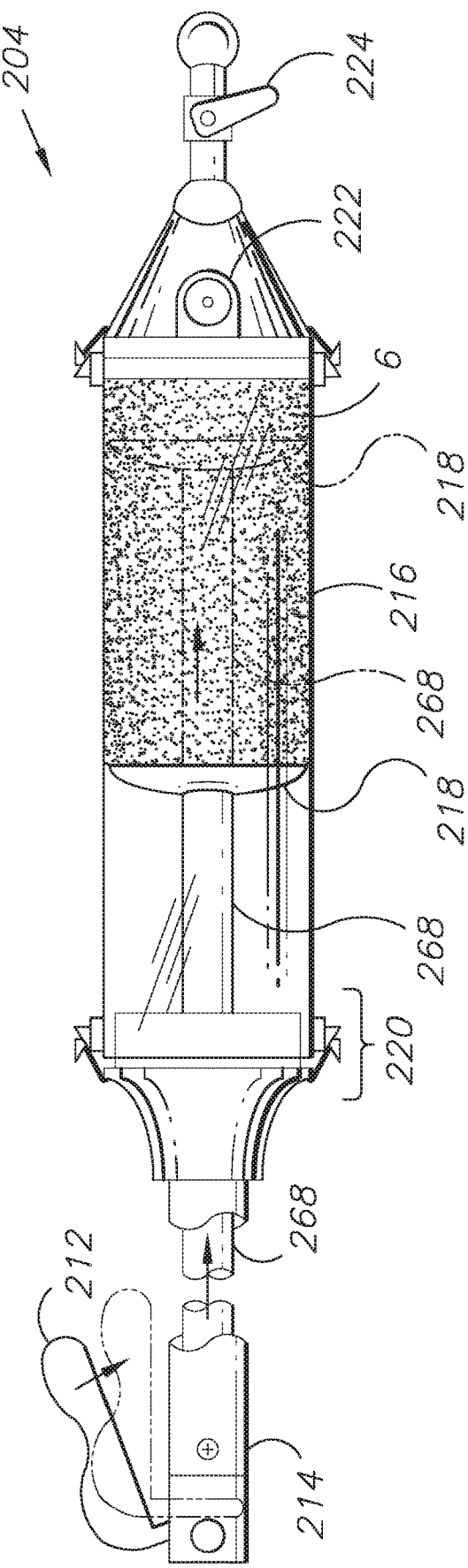
FIG. 16 is an elevational view of the invention with a description of a procedure for operating the dispenser.
Figure 17:
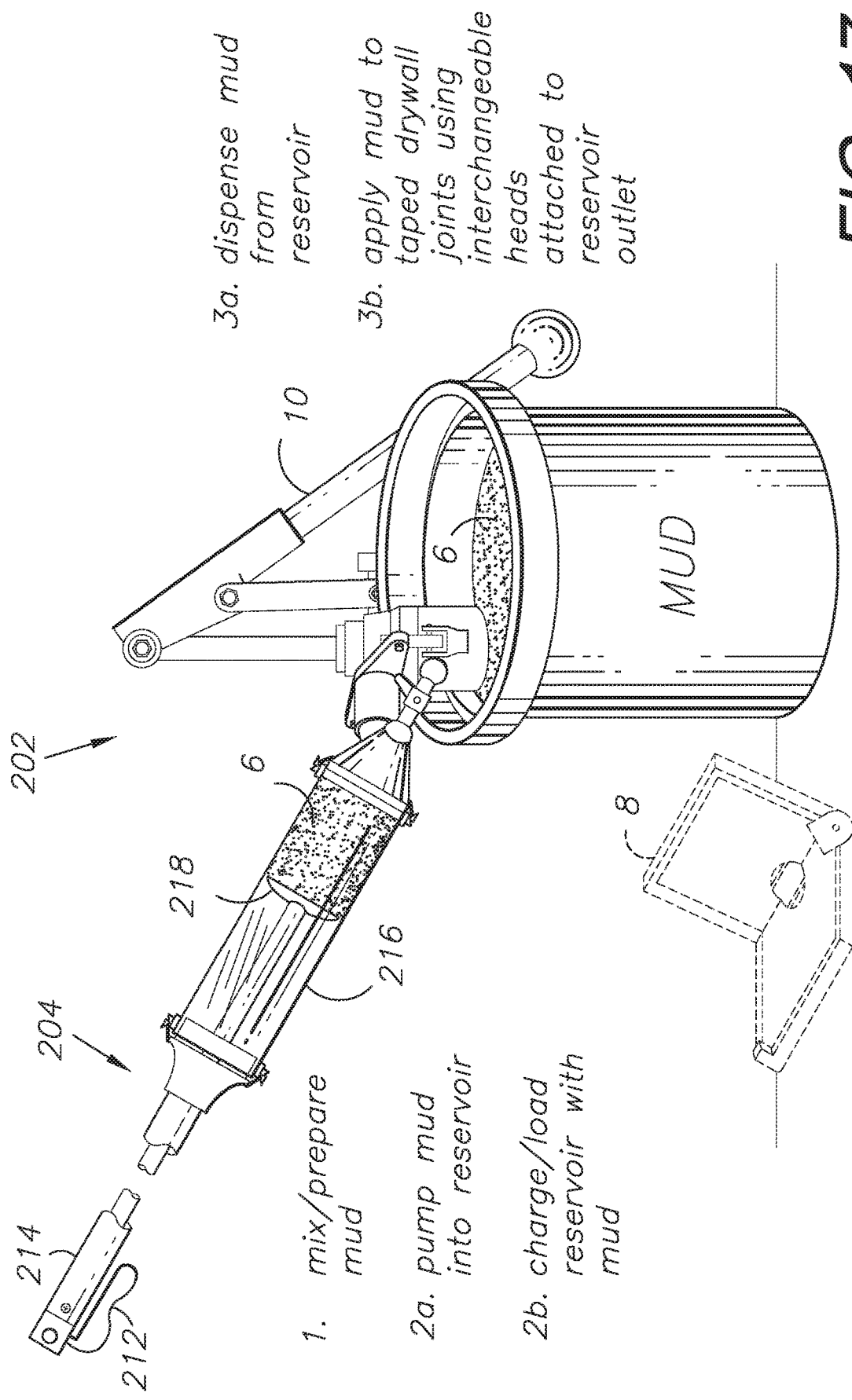
FIG. 17 is a view thereof including a compound material container, a compound pump and a corner finishing tool.
Figure 18:
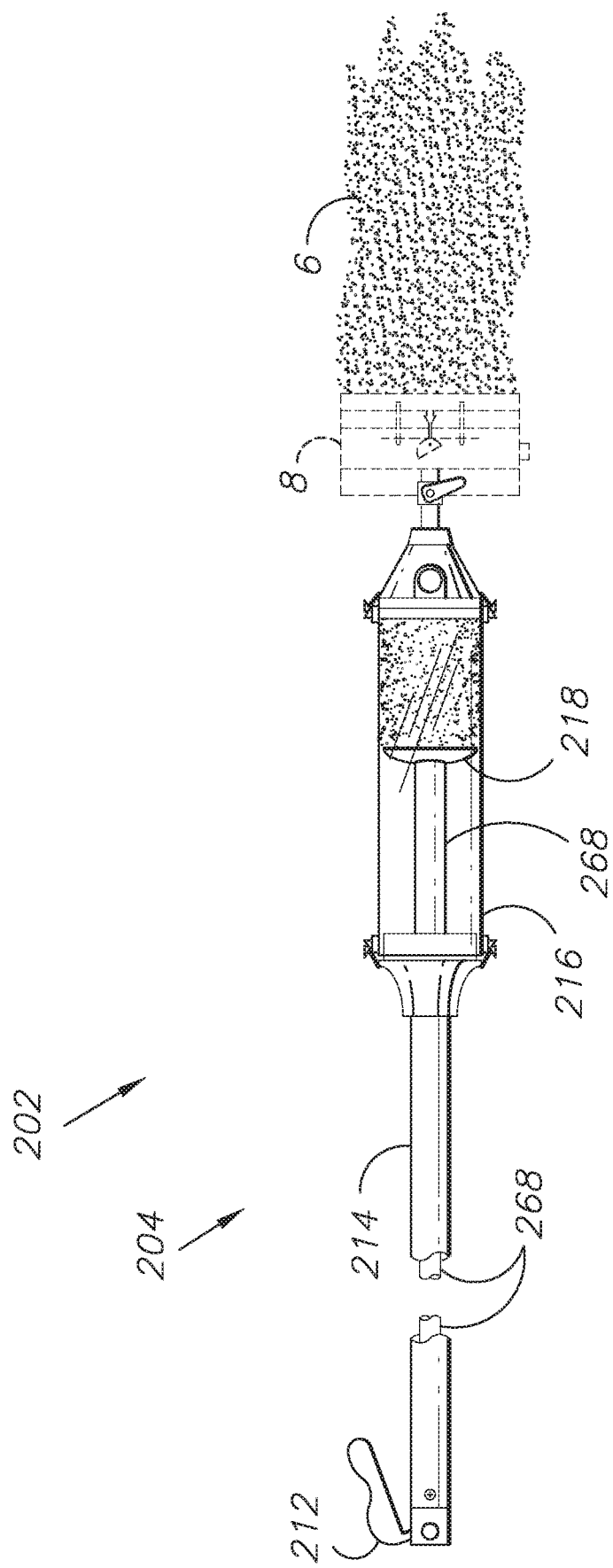
FIG. 18 is an elevational view thereof, shown in use.
Figure 19:
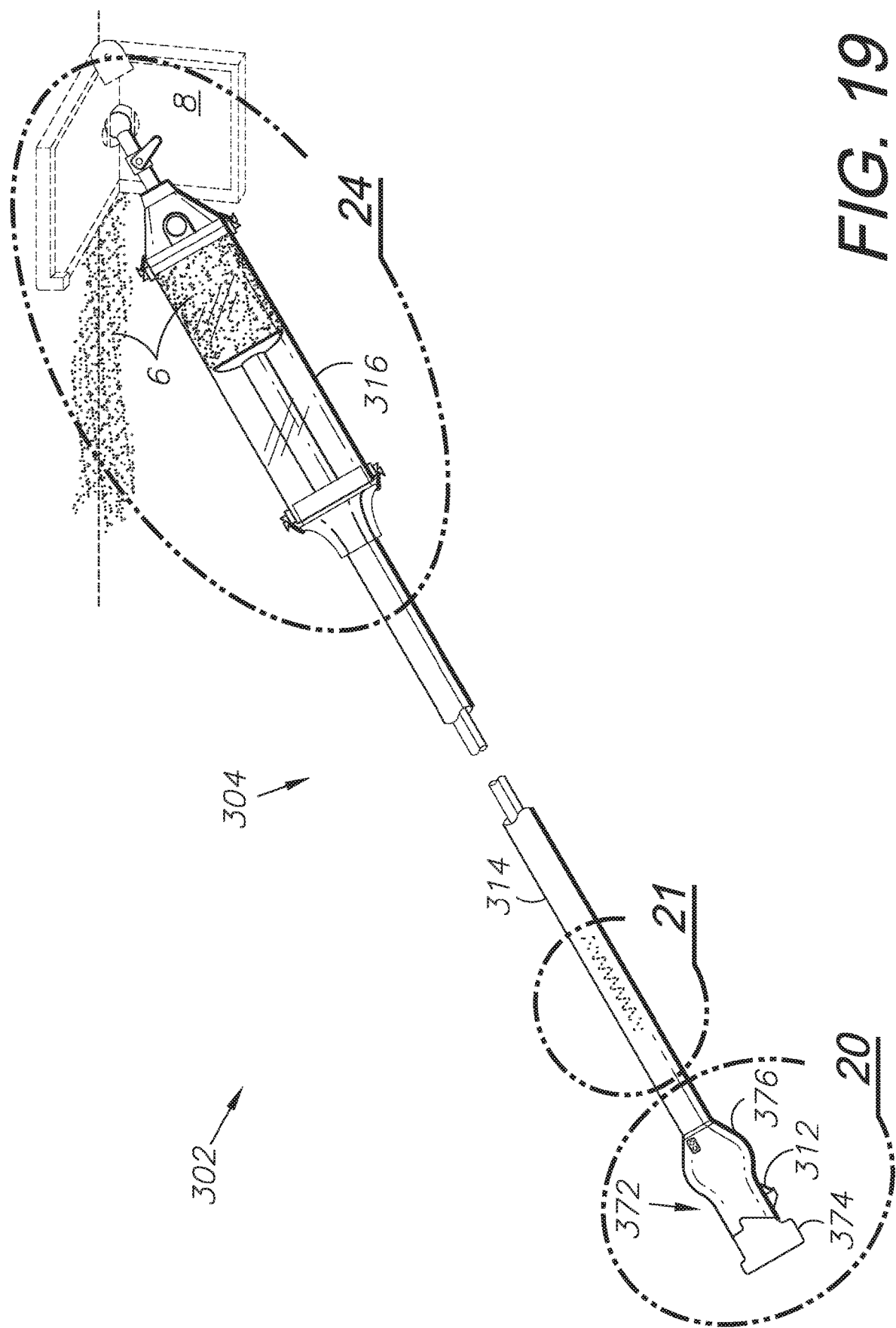
FIG. 19 shows another alternative or modified aspect of the invention, shown in use and including a rechargeable battery power source.
Figure 20:
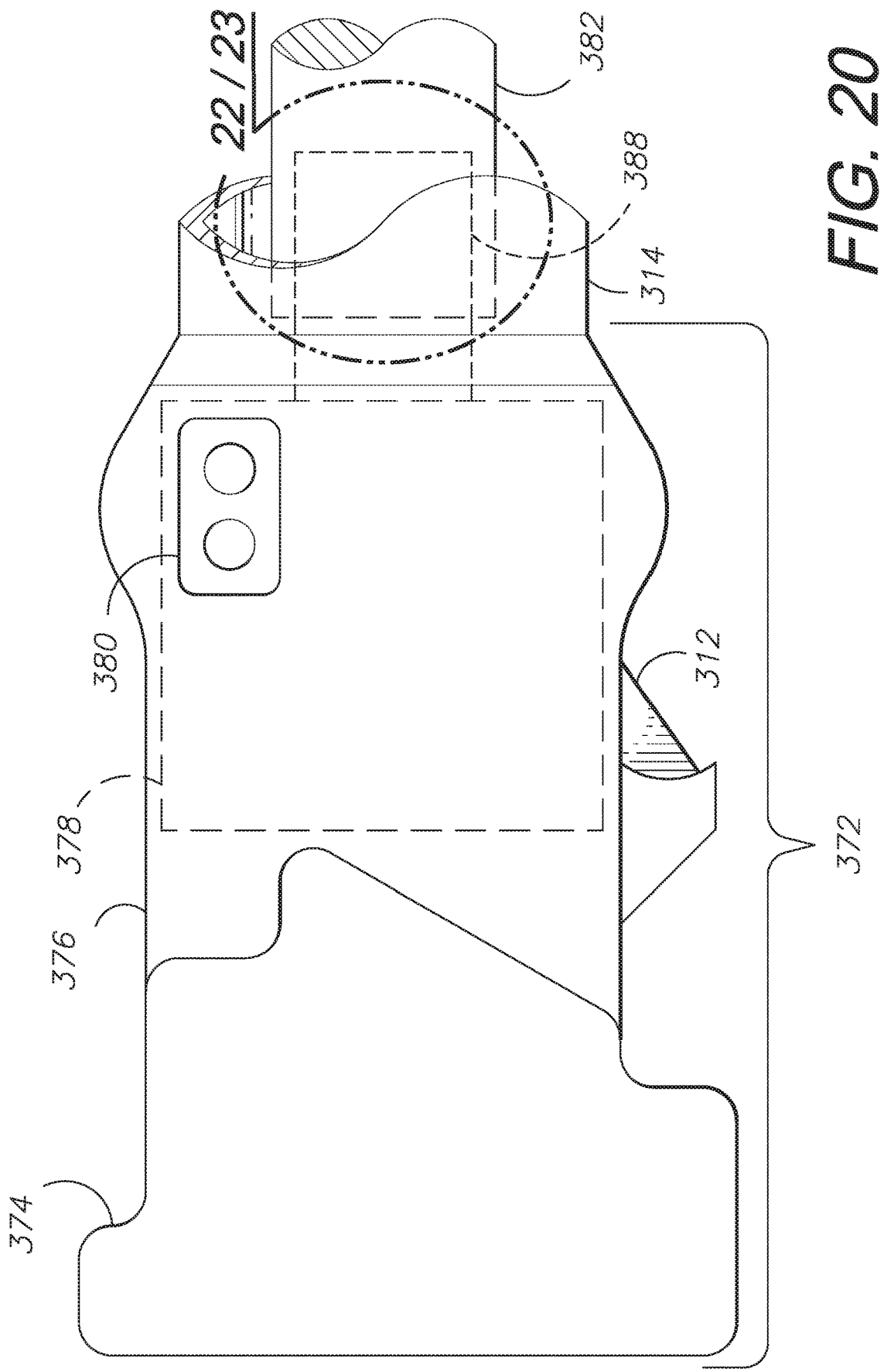
FIG. 20 is an enlarged, fragmentary view thereof, taken generally in area 20 in FIG. 19.
Figure 21:
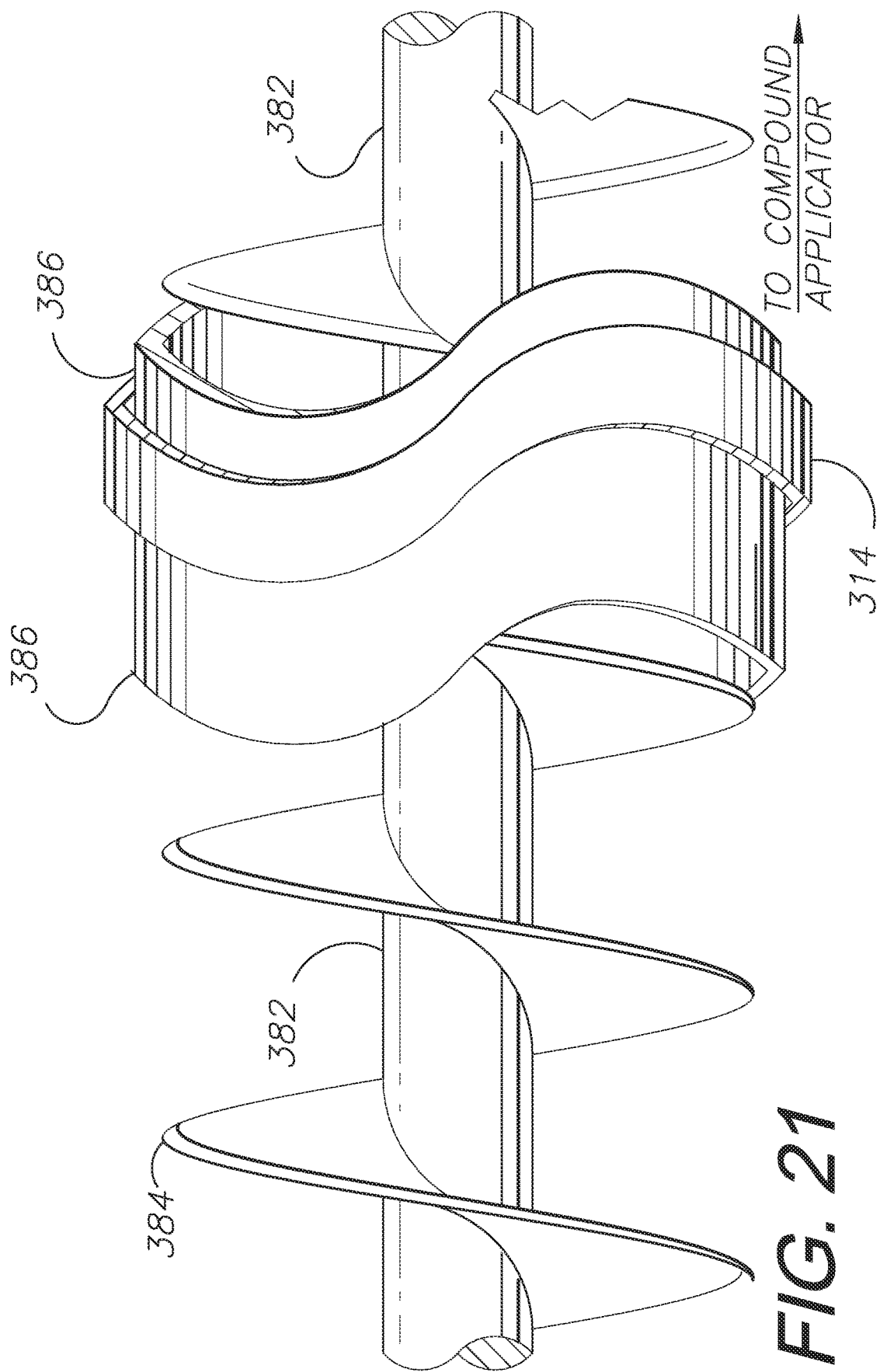
FIG. 21 is an enlarged, fragmentary view thereof, taken generally in area 21 in FIG. 19.

The system 202 can also include a trigger latch 260. FIG. 13A shows the trigger mechanism 212 in an un-engaged, extended position. The trigger latch button 260 extends from the body of the handle 214 with the trigger mechanism 212 in its extended, un-engaged position (FIG. 13A). Squeezing the trigger mechanism 212 inwardly towards the handle 214 rotates the trigger mechanism 212 out of the way of the latch 260 which can then be depressed (FIG. 13B) to retain the trigger mechanism 212 from rotating back to its un-engaged position. Upon pressing the latch button 260 again, the latch "pops out" of the way of the trigger 212. A trigger compression spring 270, compressed by the trigger, can now expand, pushing the trigger 212 back to its un-engaged position. This arrangement can aid in continuous compound 6 dispensing without requiring a user to squeeze the trigger the entire time.

Alternatively, the dispensing-locking positions of the trigger mechanism 212 can be reversed whereby squeezing the trigger mechanism 212 causes the tool assembly 204 to dispense material. The operation of the latch 260 can likewise be changed as appropriate for particular applications and to accommodate user preferences.

The system 202 can, similarly to the previously-described embodiments, incorporate a fill access port 222, a ball valve throttle 224, and/or one or more openable clamp assemblies 220 to simplify use.

V. Fourth Modified Embodiment or Alternative Aspect of the Invention (FIGS. 19-27)

Yet another alternative embodiment or aspect of the invention (FIGS. 19-27) comprises a system designated 302 and including a compound-dispensing tool 304 driven by a motor unit 372 at a proximal end of a handle 314. The motor unit 372 is powered by a rechargeable battery 374 and actuated by a trigger mechanism 312. Depressing the trigger 312, that is, squeezing it toward the body of the handle 314, activates a motor 378 which receives power from the battery 374. The motor 378 rotates a motor shaft 388 which, in turn, rotates an auger shaft 382 and auger 384, which advances the compound material 6 for discharge via an application tool 8.

Alternatively, the motor 378 can drive a threaded shaft threadably connected to a plunger 318 for expelling the material 6 contents of the reservoir 316. Upon release of the trigger 312 the motor 378 is no longer powered and ceases to rotate the shaft 382, thereby stopping the discharge flow of material 6.

A variable- or static-speed forward/reverse (reverse optional) switch 380 can be included in the assembled tool 304. The switch 380 can control the speed and rotational direction of the motor 378 and can be housed with the motor 378 within the motor housing 376. The switch 380 can include forward and reverse closed positions for dispensing compound 6 or reloading (recharging) the reservoir 316, or retracting the plunger 318.

Threaded rods, plungers and other operative components can be utilized with a reversible electric motor, such as the drive motor 378. Moreover, compound materials 6 can be loaded into and discharged from hollow portions of handles (e.g., 314) and/or reservoirs (e.g., 316) using suitable augers or shaft-plunger assemblies, which are rotated by the drive motor 378. For example, the threaded shaft 386 could extend through most of the length of the reservoir 316 and threadably mount the plunger 318 thereon for advancing and retracting through the reservoir 316 in a reciprocating range of motion.

Figure 22:
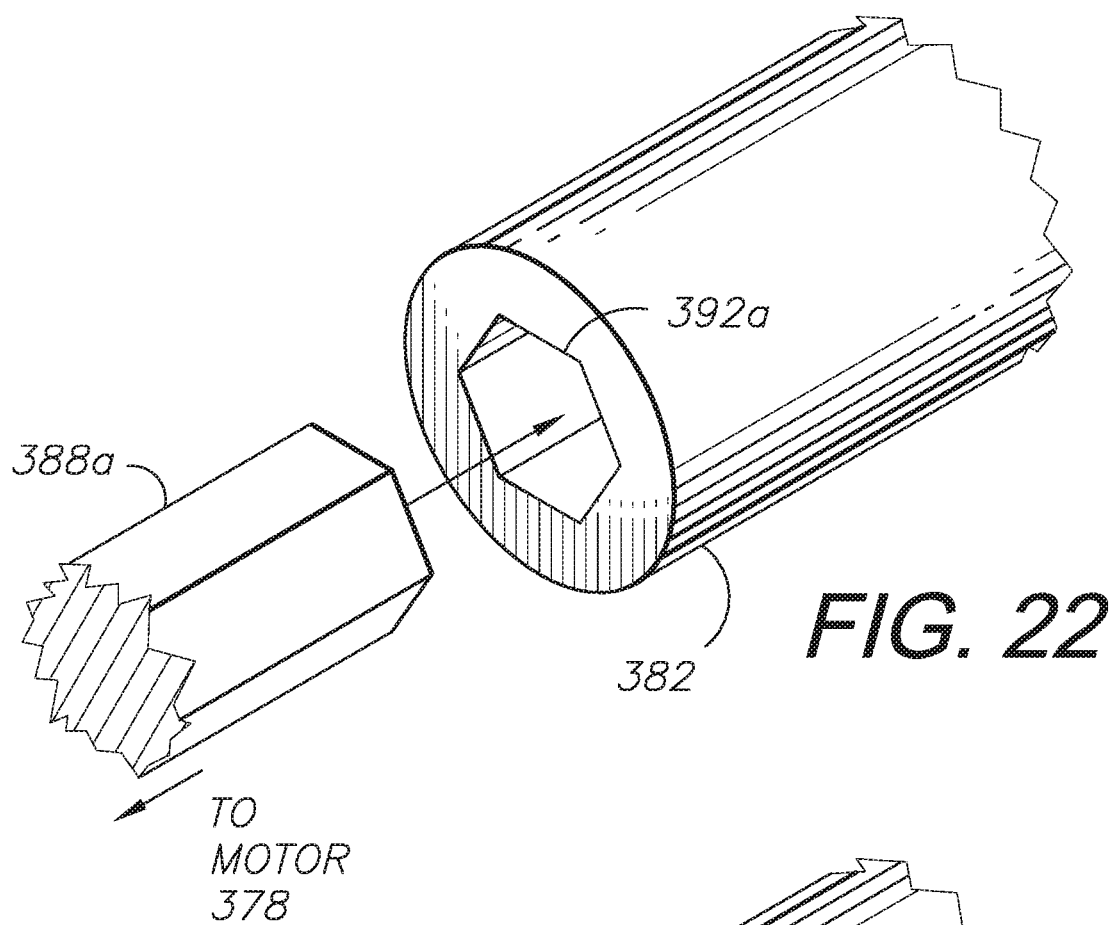
FIG. 22 is a fragmentary, perspective view thereof taken generally in area 22/23 in FIG. 20, particularly showing a connection between the motor shaft and the auger shaft.

FIG. 22 shows a mating connection between the motor 378 and the auger shaft 382. In this mating connection a hexagonal motor shaft 388a fits into a hexagonally-shaped hub 392a inside the auger shaft 382. This removable mating connection allows the motor 378 to rotate the auger shaft 382.

Figure 23:
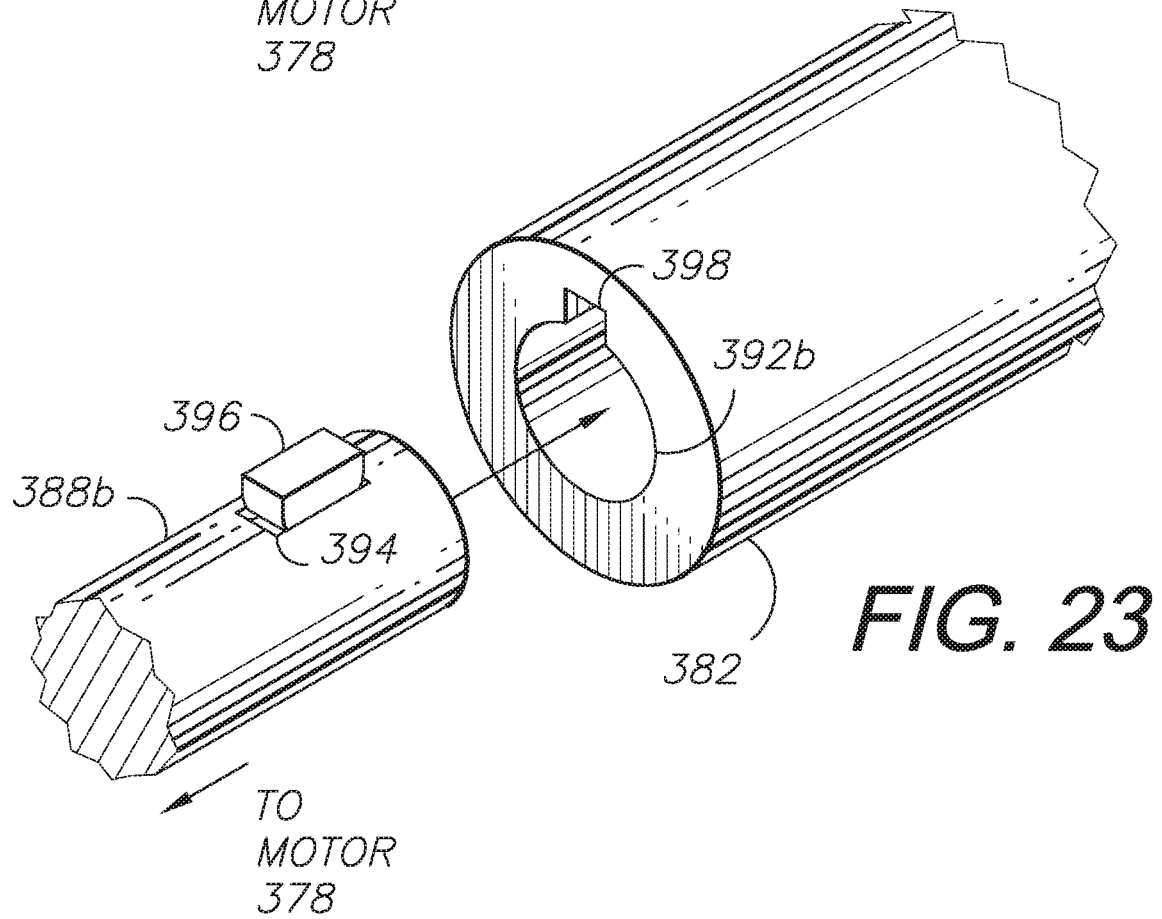
FIG. 23 is a fragmentary, perspective view thereof taken generally in area 22/23 of FIG. 20, particularly showing an alternative connection between the motor shaft and the auger shaft.
Figure 24:
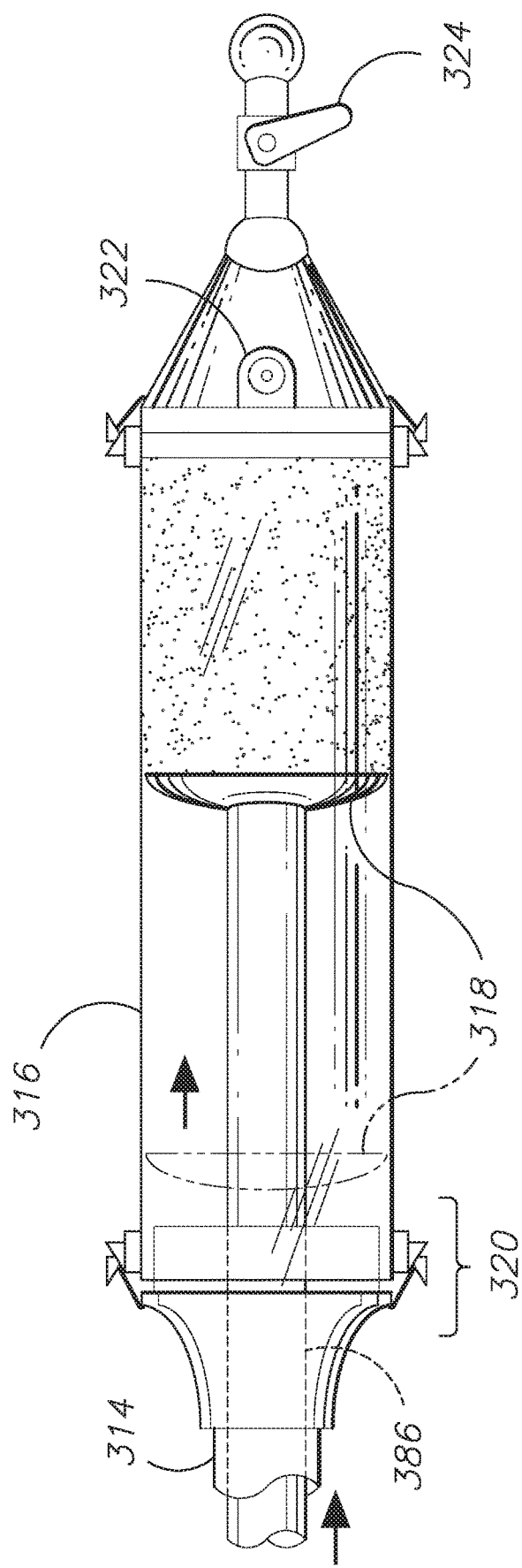
FIG. 24 is an enlarged, view thereof, taken generally in area 24 in FIG. 19.
Figure 25:
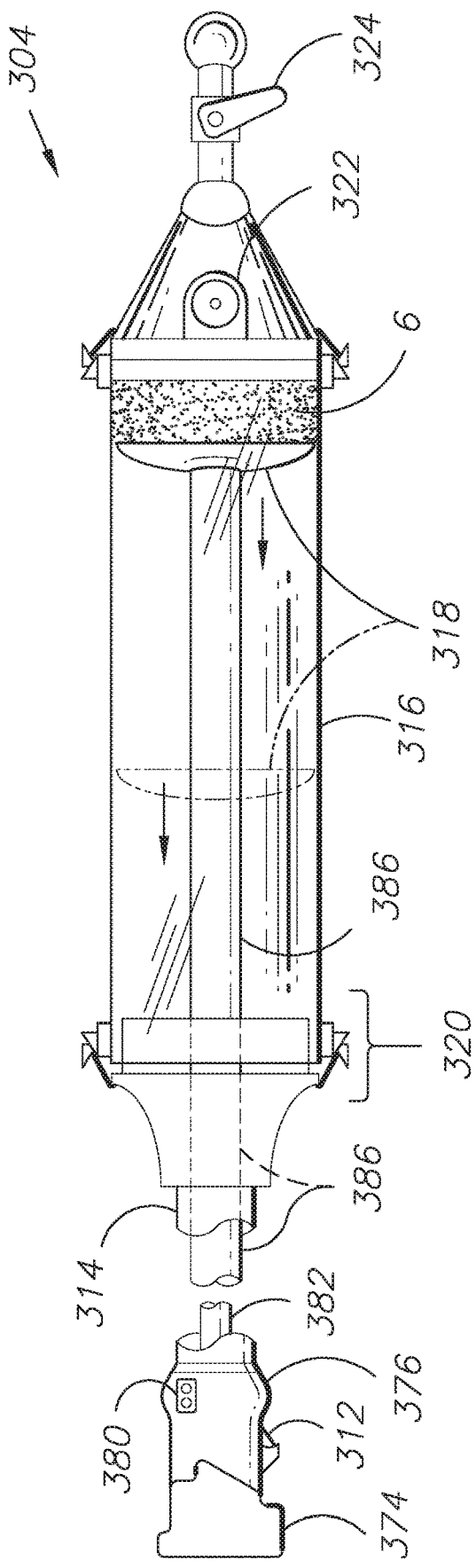
FIG. 25 is an elevational view thereof and including a description of a (re)charging process.
Figure 26:
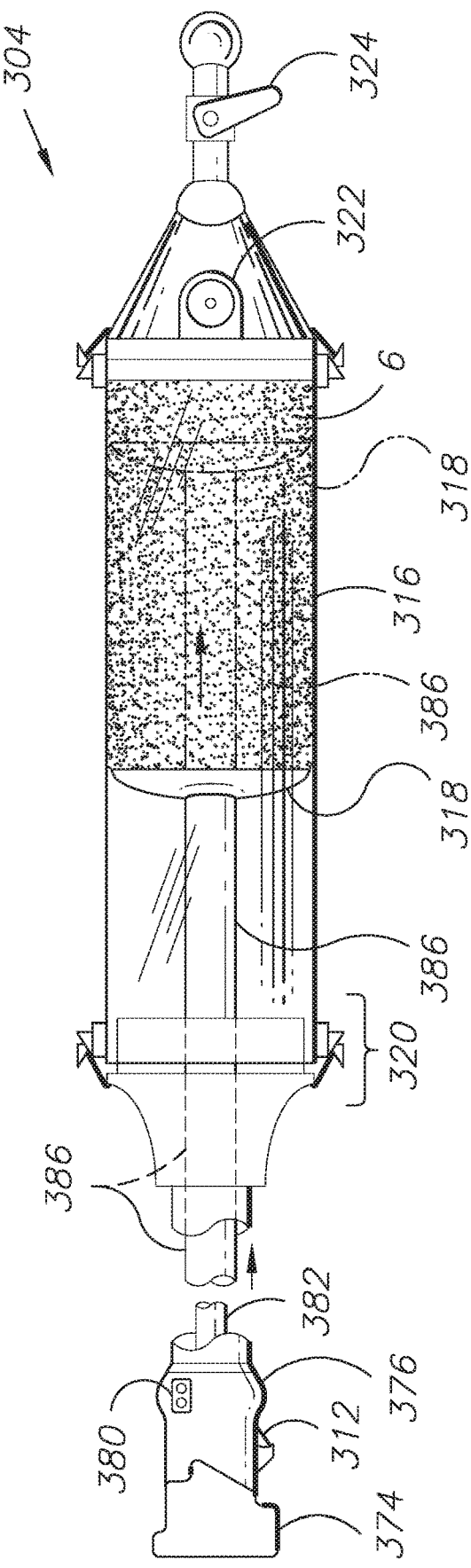
FIG. 26 is a front elevational view thereof and including a description of a dispensing process.

Another embodiment of a potential mating connection between the motor 378 and the auger shaft 382 is shown in FIG. 23. This embodiment of a mating connection employs a keyed motor shaft 388b to fit inside a keyed hub 392b within the auger shaft. An example key seat 394, key 396, and key way 398 are depicted in FIG. 23. The key arrangement shown is one example of a potential key connection and is not intended to be limiting. Keyed connections including other arrangements thereof are common in the art and should be easily understood by one skilled in the art.

Figure 27:
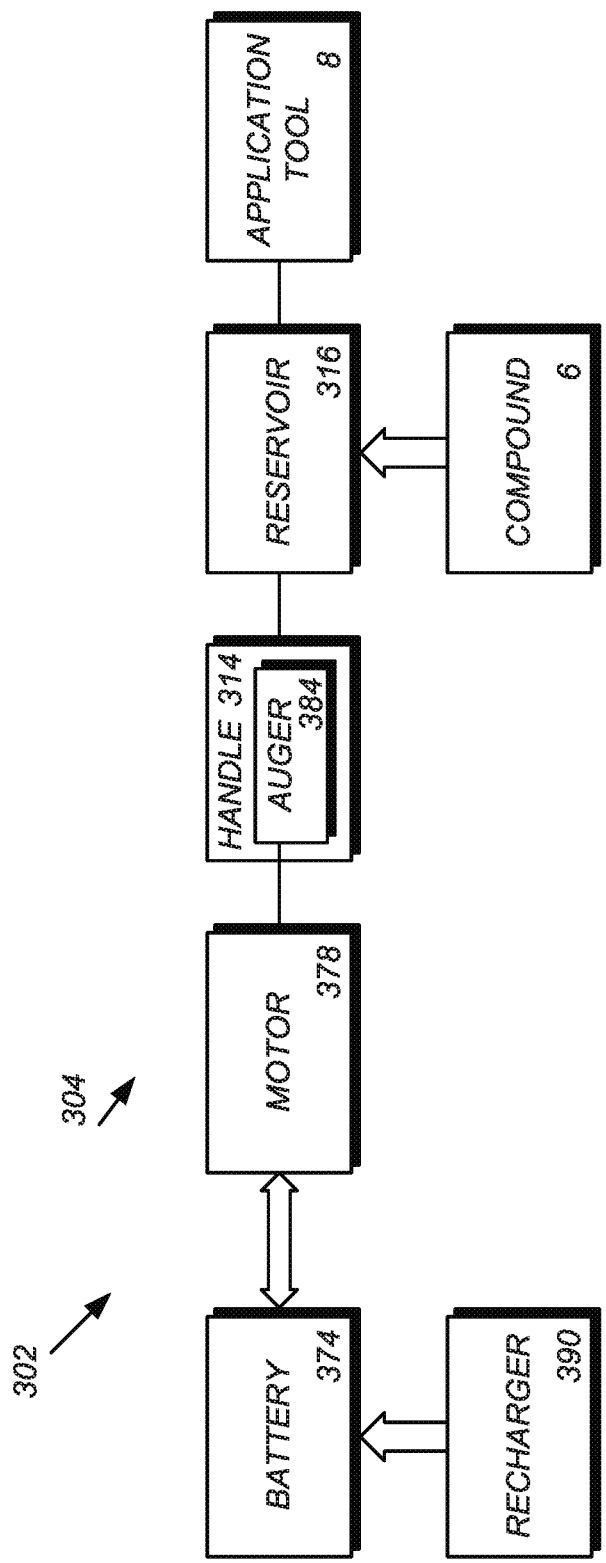
FIG. 27 is a block diagram of a compound application system embodying an aspect of the present invention.

The battery 374 can be recharged by removing it from the assembled tool 304 and connecting it to a charger 390 (FIG. 27).

The system 302 can, similarly to the previous embodiments, incorporate a fill access port 322, a ball valve throttle 324, and one or more openable clamp assemblies 320 to simplify use.

VI. Fifth Modified Embodiment or Alternative Aspect of the Invention (FIGS. 28-34)

Figure 28:
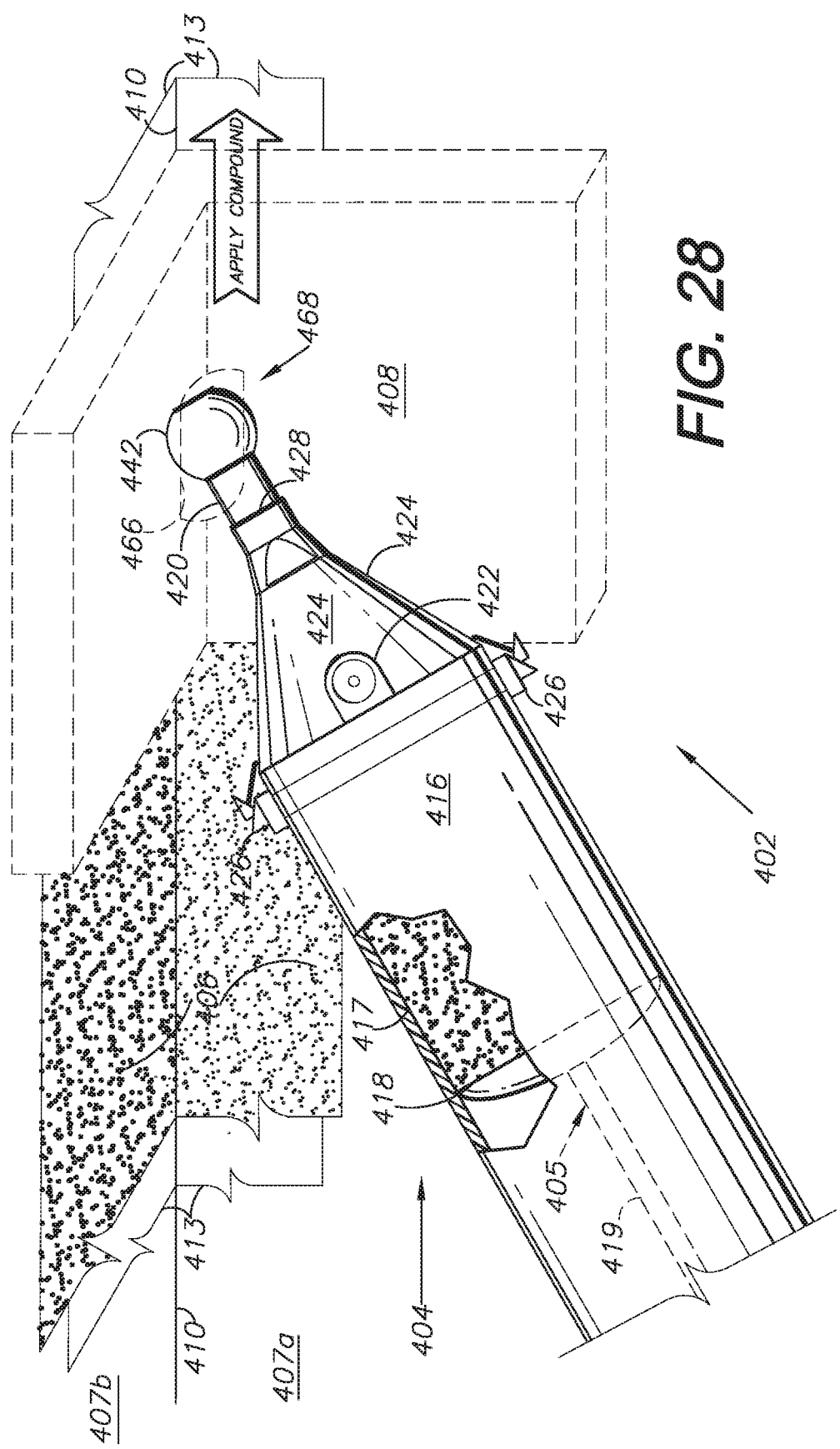
FIG. 28 is a fragmentary view of a compound applicator comprising another modified or alternative aspect of the present invention with a push-to-open check valve, shown applying compound to a horizontal, wall-ceiling joint.
Figure 29:
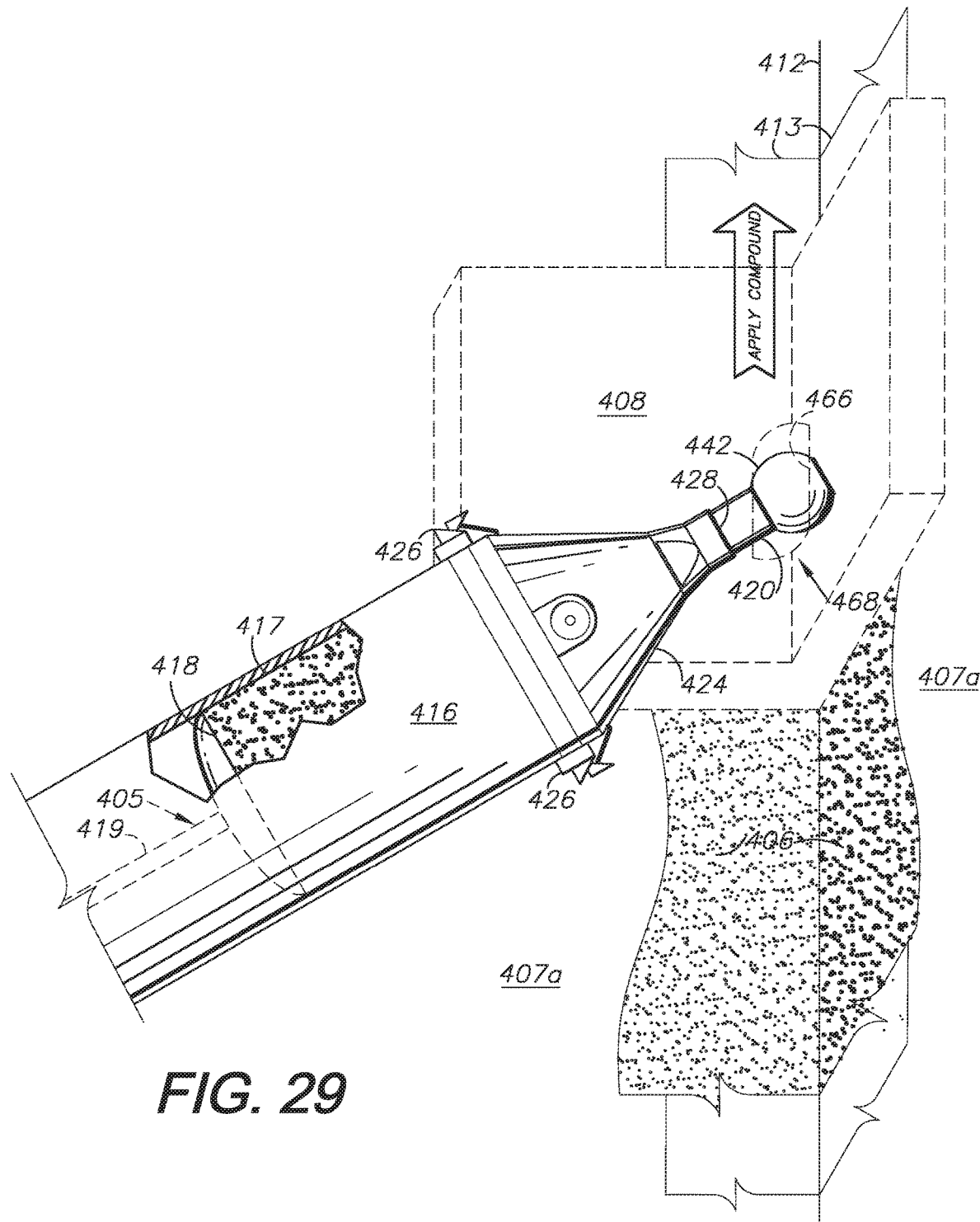
FIG. 29 is a fragmentary view of the modified, push-to-apply applicator, shown applying compound to a vertical, wall-wall joint.
Figure 34:
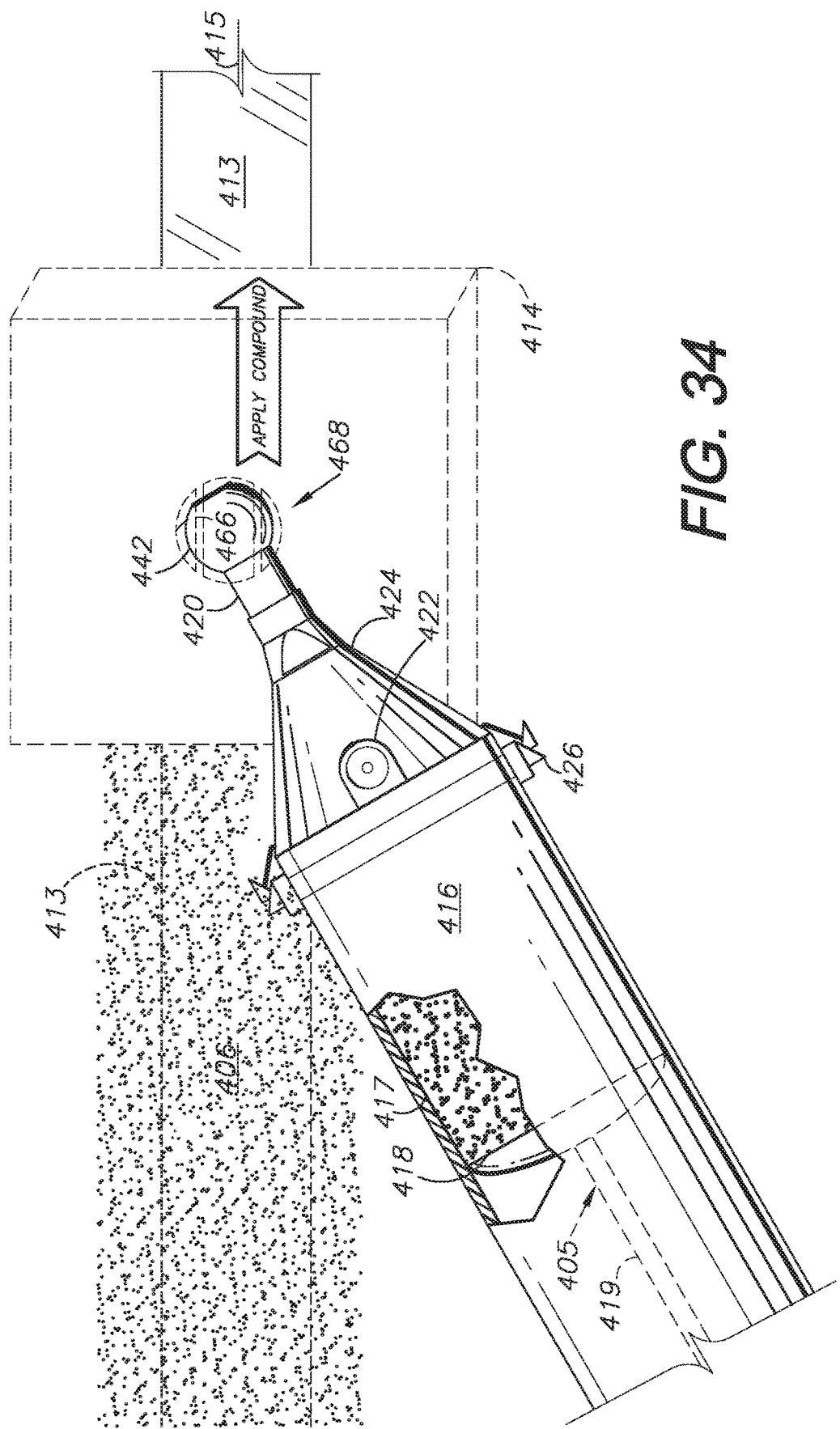
FIG. 34 is a fragmentary view of the alternative embodiment applicator, shown equipped with a flat surface attachment, shown applying compound to a wall joint.

A fifth modified embodiment or alternative aspect of the invention comprises a compound-applying system 402 including a push-to-dispense tool 404 with a quantity of finishing compound 406 in a hollow reservoir 416 including a bore 417. A linear actuator 405 includes a plunger 418 mounted on a connecting rod 419 and reciprocably received in the reservoir bore 417 for discharging the compound 406 through a distal, push-to-open valve assembly 420, to an angle head applicator 408 and then onto a work surface or surfaces. For example and without limitation, FIG. 28 shows the system 402 applying compound 406 to a horizontal, wall-ceiling joint 410 between a wall 407a and a ceiling 407b with the angle head applicator 408. FIG. 29 shows compound 406 being applied to a vertical, wall-wall joint 412 between walls 407a. FIG. 34 shows the system 402 with a flat head applicator 414, which is adapted for applying compound to a wall joint 415.

Typical gypsum board (also known as drywall) construction involves attaching the gypsum board sheets to the wall or ceiling structure, applying perforated, paper, joint tape 413 (FIG. 34) with a first coat of compound, applying perforated metal or plastic corner-protecting beads, and applying additional coats of compound. After drying and before recoating, each coat is typically sanded with special hand tools. Skilled workers can achieve relatively smooth, flat, planar results by applying a sufficient number of coats of compound and sanding each coat to a smooth surface finish. In the construction trades, drywall finishes are graded based on quality, with level five (5) being considered a top quality, commercial-grade finish, which is generally free of blemishes and imperfections.

The linear actuator 405 can comprise a gas piston-and-cylinder unit, a compressible spring unit or some other mechanism for advancing the plunger 418 through the reservoir 416. Alternative suitable linear actuators are described above. The reservoir 416 is refillable through an inlet (fill) port 422, which can be connected to a suitable pump for pumping the contents of a compound bucket into the reservoir 416 in a reloading or recharging operation. A generally conical dispensing head 424 is mounted on the distal end of the reservoir 416 by clamps 426, which permit field removal for cleaning, servicing, etc. The dispensing head 424 mounts the valve assembly 420.

Figure 30:
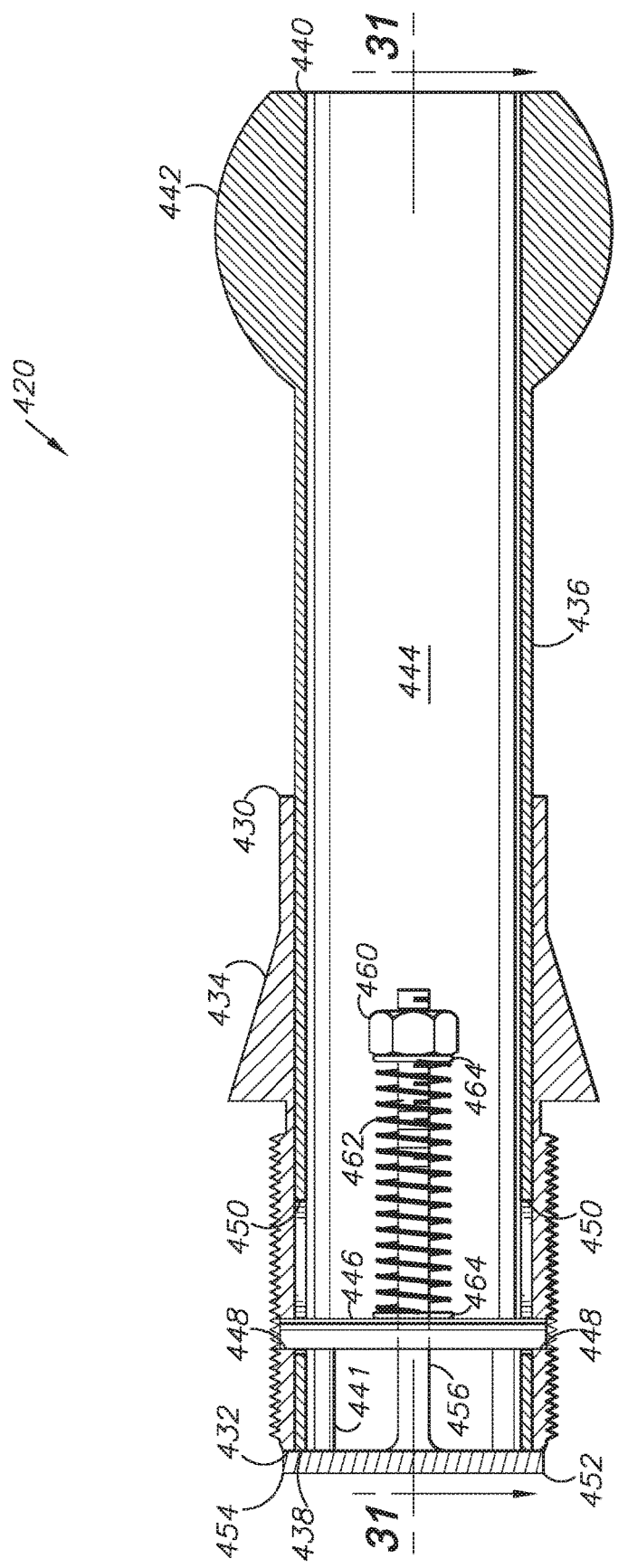
FIG. 30 is a cross-sectional view of a valve assembly of the modified, push-to-apply applicator, shown in a closed position.
Figure 31:
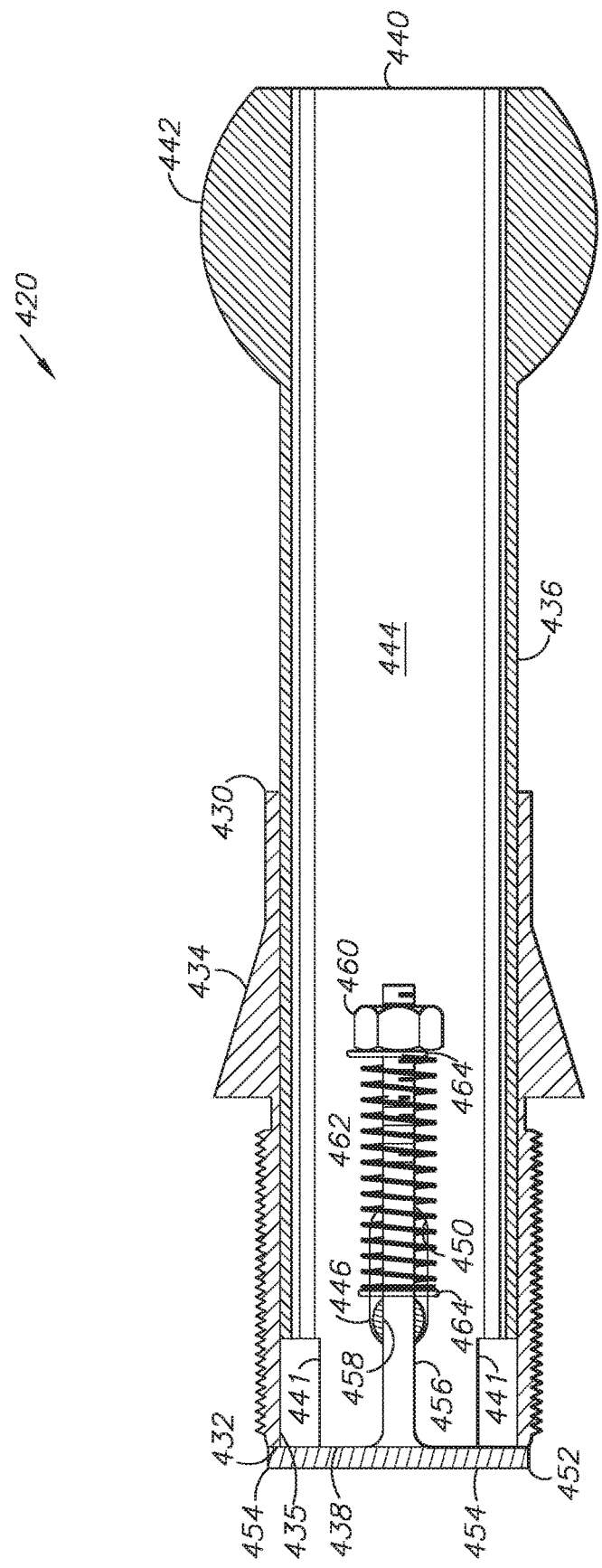
FIG. 31 is another cross-sectional view of the valve assembly in the closed position.
Figure 32:
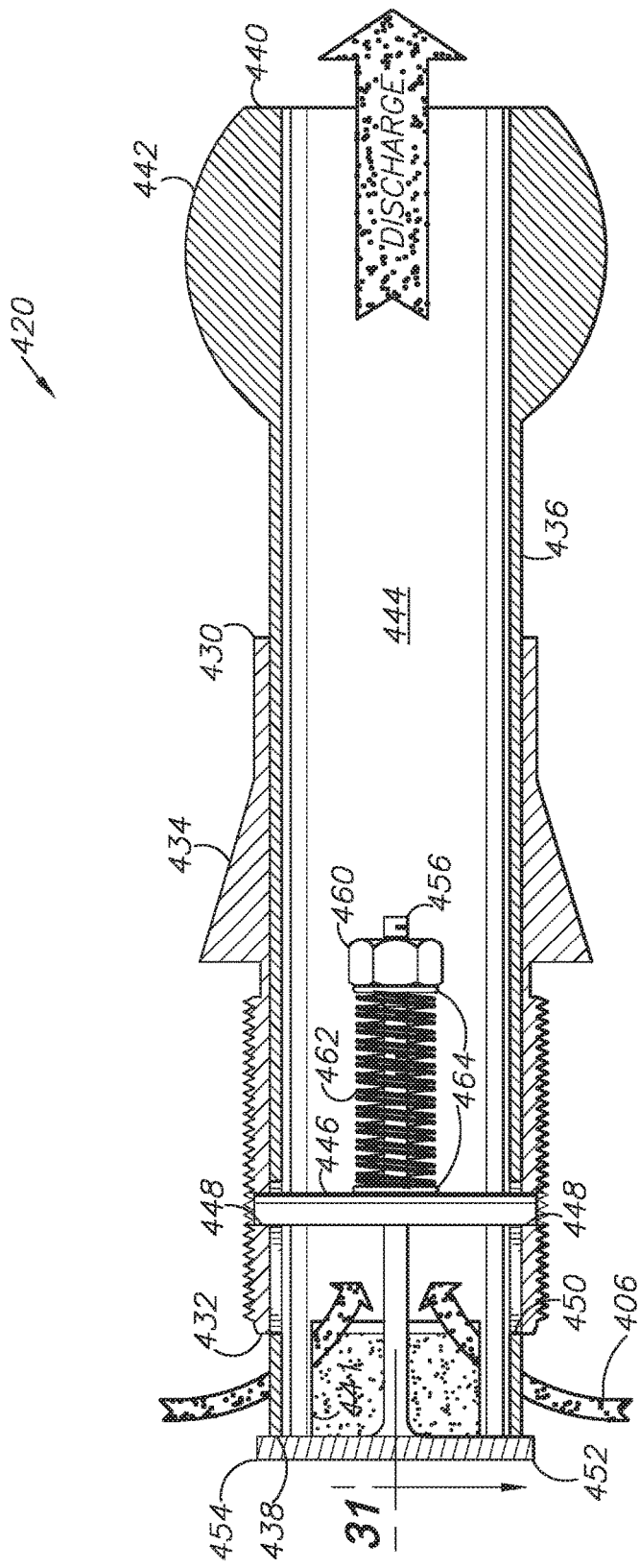
FIG. 32 is a cross-sectional view of the valve assembly in an open position.
Figure 33:
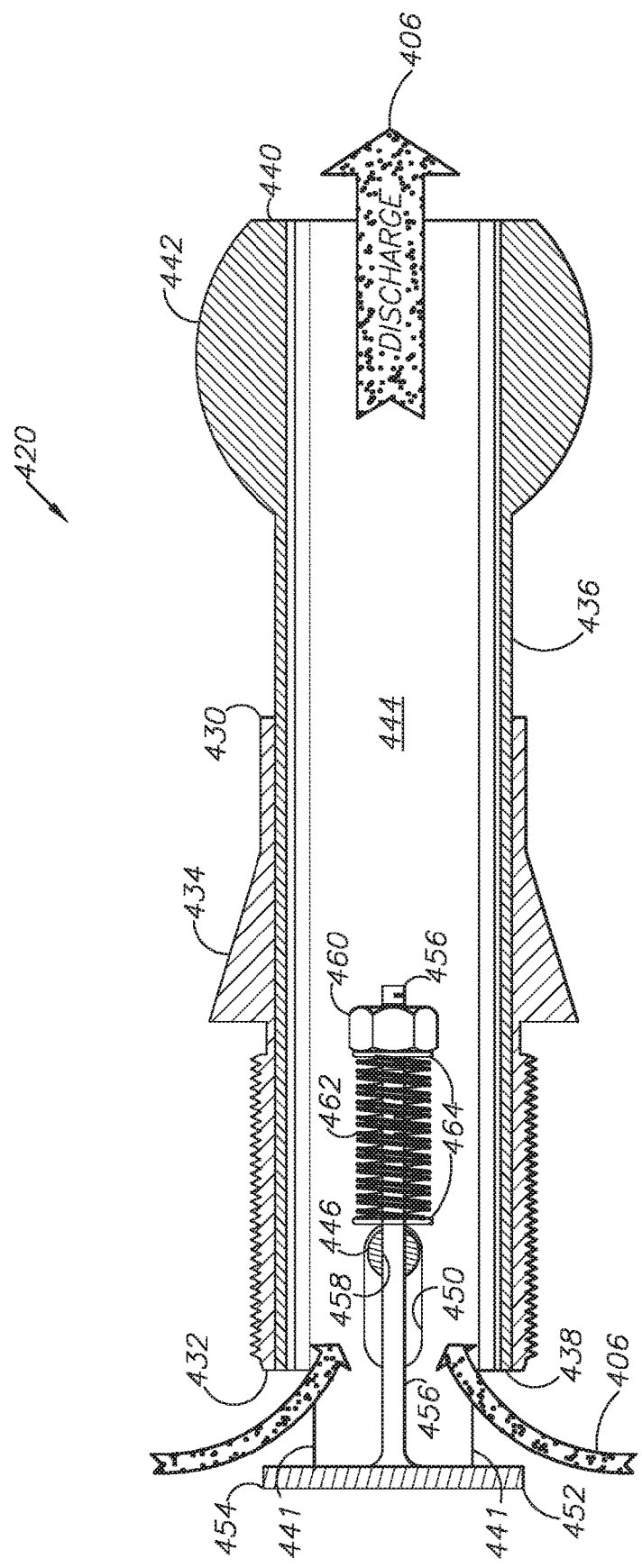
FIG. 33 is another cross-sectional view of the valve assembly in the open position.

FIGS. 30 and 31 show the push-to-open valve assembly 420 in a closed position. The valve assembly 420 includes an outer sleeve 430 with an externally-threaded proximal end 432, which screws into a distal end 428 of the dispensing head 424. The outer sleeve 430 also includes a tapered, distally-converging section 434 which generally aligns with the dispensing head 424. The valve assembly 420 also includes an inner sleeve 436 reciprocably, coaxially positioned within the outer sleeve 430 and movable relative thereto between the closed position (FIGS. 30, 31) and an open, compound-dispensing position (FIGS. 32, 33). The inner sleeve 436 includes a proximal end 438 and a distal end 440 with a partially spherical collar 442. The outer and inner sleeves 430, 436 include respective, coaxial bores 435, 444.

A valve guide pin 446 extends diametrically across the bore 444 and is secured at its ends in receivers 448 in the threaded, proximate end 432 of the outer sleeve 430. The guide pin 446 is slidably received in perspective guide slots 450 formed in the inner sleeve 436. A valve 452 includes a disc-shaped valve head 454 and a threaded valve shaft 456 extending coaxially therefrom through a valve shaft hole 458 formed in the middle of guide pin 446. The valve shaft 456 threadably receives a retaining nut 460. A helical compression spring 462 is compressed between the guide pin 446 and the retaining nut 460 with intermediate washers 464 at the ends of the compression spring 462.

The tool 404 is assembled by snapping the partially-spherical collar 442 into the socket 466 formed in the angle head and flat head applicators 408, 414. The resulting ball-and-socket connection between the collar 442 and the socket 466 provides a multi-axis, universal joint swivel connection, enabling the tool 404 to be positioned at various angles relative to the applicators 408, 414 and the joints 410, 412, 415 being finished.

The push-to-open operation of the valve assembly 420 accommodates relatively simple operation with minimal effort by an operator. More specifically, the compression spring 462 retains the valve 452 in a closed position with the valve head 454 engaging the outer sleeve proximal end 432, thus blocking the flow of compound 406 into the inner sleeve bore 444. Pushing the applicator 408, 414 against a surface pushes the inner sleeve 436 proximally into the reservoir bore 417 and compresses the return spring 462. Passages 441 in the inner sleeve 436 are thus exposed to the compound 406 in the reservoir 416. The compound 406, under pressure via the plunger 418, is forced through the inner sleeve bore 444 and is distributed onto the work surface by the applicator 408 or 414. Compound flow is halted by merely retracting the tool 404 from the work surface.

In addition to the simplified operation of the system 2 with the push-to-release feature described above, the system 402 accommodates efficient maintenance and cleaning. For example, the valve assembly 420 can readily be separated from the applicator 408 or 414 by unsnapping the ball-and-socket joint 468. The valve assembly 420 can then be unscrewed from the dispensing head 424. Unscrewing the nut 460 releases the valve member 452 and the return compression spring 462. The entire valve assembly 420 can be further disassembled by tapping the guide pin 446 through the receivers 448, thus releasing the outer and inner sleeves 430, 436. The separated parts can then be cleaned, maintained and replace as necessary. Other parts of the system 2 can likewise be efficiently disassembled, cleaned, maintained and replaced.

VII. Sixth Modified Embodiment or Alternative Aspect of the Invention (FIGS. 35-39)

A sixth modified embodiment or alternative aspect of the present invention is a finishing compound application system 502 with a push-to-dispense tool 504. The push-to-dispense tool 504 includes a modified valve assembly 520 equipped with a flow adjustment mechanism 570 configured for controlling flow through the push-to-open valve assembly 520.

Like the embodiment described above, the sixth modified embodiment finishing compound application system 502 has a hollow reservoir 416 including a bore 417 and configured for receiving, holding, and dispensing a quantity of gypsum board (also known as drywall) finishing compound 406. Preferably, the flow adjustment mechanism 570 is externally adjustable to allow a user to easily adjust finishing compound flow, as desired. However, alternative embodiments can have internally adjustable flow adjustment mechanisms. The push-to-open valve assembly 520 in this embodiment can be a replacement for the push-to-open valve assembly 420 described above, connecting to the dispensing head 424 and applicator 408, 414 in the same manner as the push-to-open valve assembly 420 described above.

Like the embodiment described above, the finishing compound application system 502 includes a linear actuator 405 having a plunger 418 mounted to a connecting rod 419 and reciprocably received within the reservoir bore 417. The linear actuator 405 is configured for discharging finishing compound 406 from the reservoir bore 417 distally through the push-to-open valve assembly 520, to an applicator head 408, 414, and then onto a work surface or work surfaces. The linear actuator 405 can be a gas piston-and-cylinder unit, a compressible spring unit, or some other mechanism for advancing the plunger 418 through the reservoir 416. Alternative suitable linear actuators are described above.

In a preferred embodiment, as shown in FIGS. 35-39, the flow adjustment mechanism 570 includes a threaded adjustment knob 572 and a stop collar 574. The proximal end 576 of the stop collar 574 is configured for making contact with the distal end 578 of the adjustment knob 572, resulting in a mechanical stop for the push-to-open valve assembly 520 when the push-to-open valve assembly 520 is engaged. The adjustment knob 572 can be moved closer to or further away from the stop collar 574, depending on the direction the knob 572 is turned. Adjustment of the flow adjustment knob 572 decreases or increases the operational range of motion 582 of the push-to-open valve assembly 520 and, correspondingly, decreases or increases the size of finishing compound fill passages or openings 541 exposed into the reservoir 416 when the push-to-open valve assembly 520 is engaged. The finishing compound fill passages or openings 541 exposed into the reservoir 416 allow pressurized finishing compound 406 from the reservoir 416 to flow into the push-to-open valve assembly 520 and to the applicator head 408, 414. Accordingly, the size of finishing compound fill passages or openings 541 exposed into the reservoir 416 affects the flow speed of the finishing compound 406 from the finishing compound application tool 504.

Such compound flow adjustment provides a number of benefits to users of the finishing compound application system 502. First, different users may prefer different finishing compound flow speeds when using the finishing compound application system 502. The flow adjustment mechanism 570 accommodates quick and easy flow adjustment when transitioning from one user to another user who prefers a different flow speed.

The flow adjustment mechanism 570 also allows for less reliance on the viscosity of mixed finishing compound 406 for the flow speed of the finishing compound application system 502. Previously, if a user wanted a consistent finishing compound flow speed, the user would have to be consistent in mixing finishing compound 406 to the same viscosity. Generally, thicker mixtures of finishing compound 406 flow slower through a finishing compound application system and thinner mixtures of finishing compound 406 flow faster. However, with the push-to-open valve flow adjustment mechanism 570 in this embodiment, the flow of finishing compound 406 can be quickly and easily adjusted, making the consistency of finishing compound 406 viscosity throughout a drywall finishing project less important and generally allowing users to mix finishing compound 406 with less precision.

Additionally, if a user wants to make a pass with the applicator head 408, 414 without adding additional finishing compound 406 to the work surface(s), the flow adjustment mechanism 570 allows a user to adjust the push-to-open valve assembly 520 to zero clearance so that no finishing compound 406 flows when force is applied to the push-to-open valve assembly 520. For instance, if a user applies more finishing compound 406 than intended to a particular section of the work surface(s), the user can quickly adjust the flow adjustment mechanism 570 to zero clearance and spread the excess finishing compound 406 with the applicator head 408, 414, without applying any additional finishing compound 406 to the work surface(s).

In alternative embodiments, the flow adjustment mechanism 570 may comprise other types of adjustment than threaded adjustment, including but not limited to, ratcheted adjustment; a removable cotter pin and associated grooves or slots; toothed adjustment; adjustable articulated attachment; and snap-in attachment. In further embodiments, the stop collar 574 on the inner sleeve 536 of the push-to-open valve assembly 520 may be adjustable in relation to a stationary stop piece on the outer sleeve 530 of the push-to-open valve assembly 520 for adjusting material flow speed, rather than having an adjustment knob or piece on the push-to-open valve outer sleeve 530.

FIGS. 35*a*, 35*b*, 36*a*, and 36*b* show cross-sectional views of the push-to-open valve assembly 520 with the flow adjustment knob 572 set to allow for approximately 50 percent clearance of the push-to-open valve assembly 520 and to correspondingly allow for approximately 50 percent of the finishing compound fill passages or openings 541 to be exposed into the material reservoir 416 when the push-to-open valve assembly 520 is engaged. Such 50 percent clearance accommodates approximately a 50 percent finishing compound 406 flow speed from the reservoir 416, through the dispensing head 424, into the push-to-open valve assembly 520, and to the applicator head 408, 414.

FIGS. 35*a* and 35*b* show the push-to-open valve assembly 520 in a closed position, with the flow adjustment knob 572 set at approximately 50 percent valve clearance. FIGS. 36*a* and 36*b* show the push-to-open valve assembly 520 in an open position, with the valve assembly 520 engaged and the flow adjustment knob 572 set at approximately 50 percent valve clearance. In some embodiments, the flow adjustment mechanism 570 may include external markings on the push-to-open valve assembly 520 to indicate exact valve clearance percentages or flow speed settings.

Figure 37A:
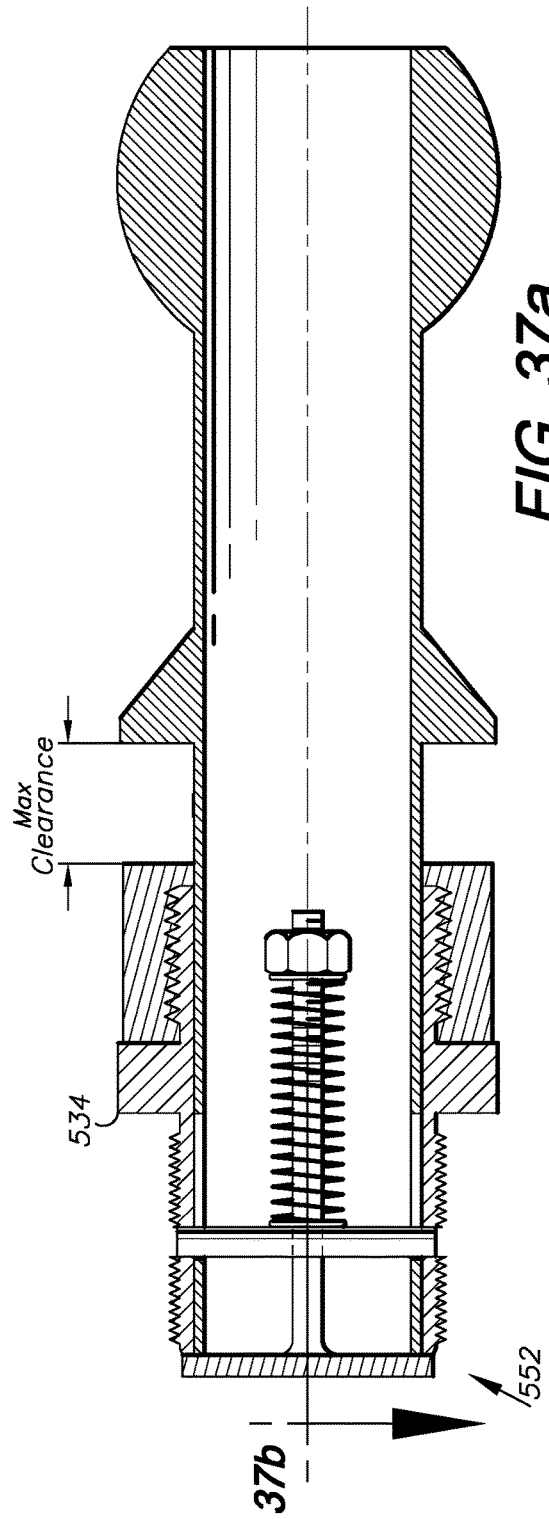
FIGS. 37a and 37b are cross-sectional views of the alternative push-to-open valve assembly, with the flow adjustment mechanism set for maximum finishing material flow and the valve assembly in closed position.
Figure 37B:
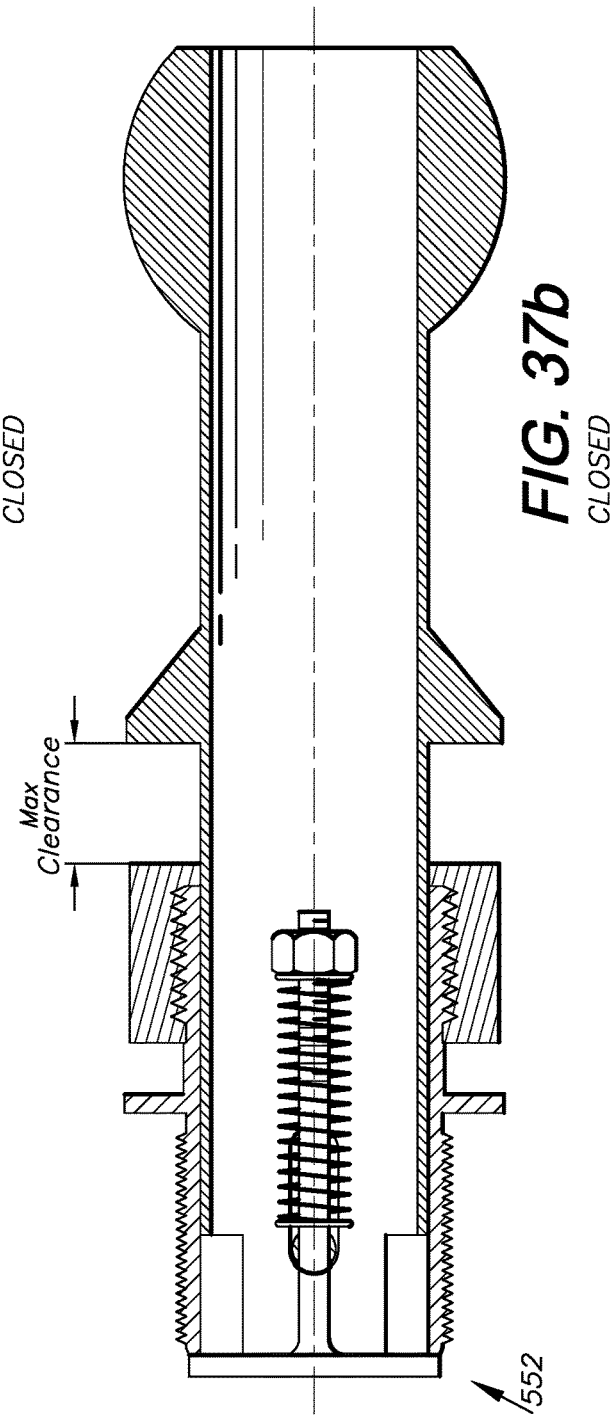

FIGS. 37*a* and 37*b* show the push-to-open valve assembly 520 in a closed position, with the flow adjustment knob 572 set at 100 percent, or maximum, valve clearance. FIGS. 38*a* and 38*b* show the push-to-open valve assembly 520 in an open position, with the valve assembly 520 engaged and the flow adjustment knob 572 set at 100 percent, or maximum, valve clearance.

The push-to-open valve assembly 520 includes an outer sleeve 530 having proximal 532 and distal ends 533, the proximal end 532 being externally threaded and configured to screw into an internally-threaded distal end 428 of the dispensing head 424. The outer sleeve 530 further includes an outwardly-extending piece 534 positioned distally of the outer sleeve threaded proximal end 532 and proximally of the flow adjustment knob 572. When the push-to-open valve assembly 520 is fully assembled into the distal end 428 of the dispensing head 424, the outer sleeve outwardly-extending piece 534 generally aligns with the distal end 428 of the dispensing head 424. The outwardly-extending piece 534 may be configured for sealing the distal end 428 of the dispensing head 424 with the valve assembly 520 assembled into the dispensing head. In an exemplary embodiment, the outer sleeve outwardly-extending piece 534 further includes a pair of parallel, straight portions 590, commonly referred to as wrench flats, positioned on the otherwise rounded outwardly-extending piece 534. These wrench flats 590 allow a user to grip the push-to-open valve assembly 520 with a wrench, plyers, or alternative tool to aid in removal from or attachment to the dispensing head distal end 428.

The push-to-open valve assembly 520 also includes an inner sleeve 536 positioned reciprocably and coaxially within the outer sleeve 530 and moveable relative thereto between the closed position (FIGS. 35*a*, 35*b*, 37*a*, an 37*b*) and an open, finishing compound-dispensing position (FIGS. 36*a*, 36*b*, 38*a*, and 38*b*). The inner sleeve 536 includes a proximal end 538 and a distal end 540 with a partially spherical collar 542 configured for connecting to an applicator head 408, 414. The outer and inner sleeves 530, 536 further include respective, coaxial bores 535, 544.

A rod-shaped, valve guide pin 546 extends diametrically across the outer sleeve and inner sleeve bores 535, 544 and is secured at guide pin ends 547 in receivers 548 located in the threaded, proximate end 532 of the outer sleeve 530. The guide pin 546 is slidably received in guide slots 550 formed in the inner sleeve 536. A valve 552 includes a disc-shaped valve head 554 and a threaded valve shaft 556 extending therefrom, coaxial with the sleeve bores 535, 544 and through a valve shaft hole 558 formed in the middle of the guide pin 546. The valve shaft 556 threadably receives a retaining nut 560. A helical compression spring 562 is compressed between the guide pin 546 and the retaining nut 560 with intermediate washers 564 at the ends of the compressing spring 562.

The inner sleeve distal end partially spherical collar 542 is configured for snapping into a socket 466, which is formed in each angle head and flat head applicator 408, 414. The resulting ball-and-socket connection between the collar 542 and the socket 466 provides a multi-axis, universal joint swivel connection, enabling the tool 504 to be positioned at various angles relative to the applicator head 408, 414 and the work surface(s) being finished.

The push-to-open operation and efficient material flow adjustment of the valve assembly 520 accommodates relatively simple operation with minimal effort by an operator. The compression spring 562 retains the valve 552 in a closed position with the valve head 554 engaging the outer sleeve proximal end 532, blocking the flow of finishing compound 406 into the inner sleeve bore 544. Pushing the applicator tool 504 against a surface pushes the inner sleeve 536 proximally into the reservoir bore 417 and compresses the return spring 562. Passages 541 in the inner sleeve 536 are thus exposed to the finishing compound 406 in the reservoir 416. The compound 406, under pressure via the plunger 418, is forced through the inner sleeve bore 544 and distributed onto the work surface(s) by the applicator 408, 414. The size of the portion of the inner sleeve passages 541 exposed into the reservoir 416, and thus the amount of material flow to the applicator head 408, 414 and work surface(s), when the valve assembly 520 is engaged is determined by the setting of the flow adjustment mechanism 570. When the valve assembly 520 is fully engaged, the stop collar 574 makes contact with the distal end 578 of the adjustment knob 572, stopping further movement of the inner sleeve 536 into the reservoir 416 and stopping further compression of the return spring 562. Finishing compound 406 flow is halted by retracting the tool 504 from the work surface(s) and the return spring 562 expanding and closing the valve 552.

Figure 39:
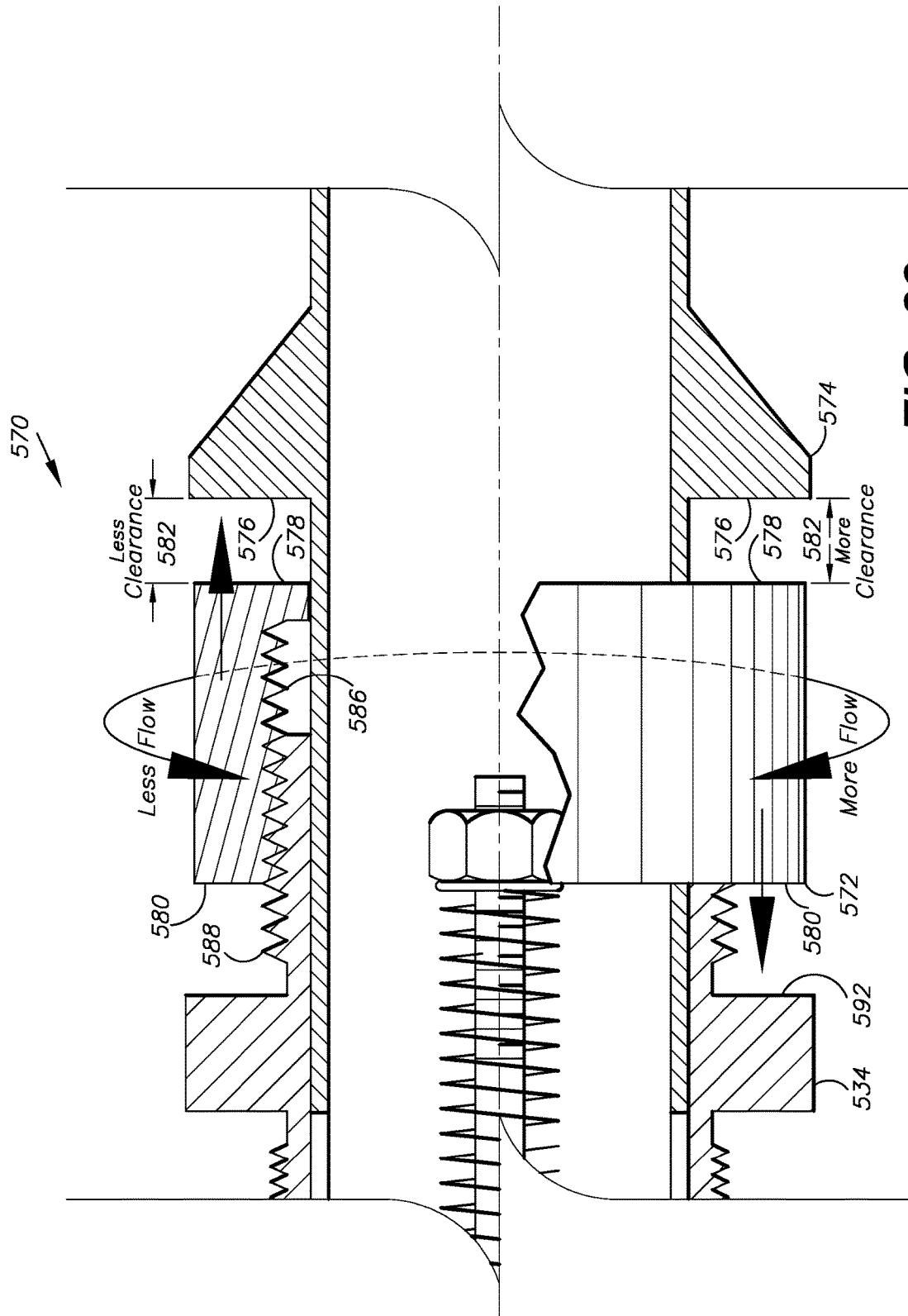
FIG. 39 is an enlarged, fragmentary, cross-sectional view of the flow adjustment mechanism of the alternative push-to-open valve assembly.

FIG. 39 shows a close-up view of the flow adjustment mechanism 570 in this embodiment. The flow adjustment knob 572 includes internal threads 586 configured for matching up with external threads 588 on the distal end 533 of the valve assembly outer sleeve 530. Turning the adjustment knob 572 in a first direction moves the adjustment knob 572 closer to the stop collar 574, providing less clearance 582 when the valve assembly 520 is engaged and, correspondingly, less finishing material 406 flow through the valve assembly 520. Turning the adjustment knob 572 in a second direction moves the adjustment knob 572 further from the stop collar 574, providing more clearance 582 when the valve assembly 520 is engaged and, correspondingly, more finishing material 406 flow through the valve assembly 520. In this embodiment, for maximum valve clearance and flow speed, the adjustment knob 572 is positioned such that the proximal end 580 of the adjustment knob 572 is immediately adjacent to the distal end 592 of the outer sleeve outwardly-extending piece 534. Conversely, with the adjustment knob 572 positioned such that the distal end 578 of the adjustment knob 572 is immediately adjacent to the proximal end 576 of the stop collar 574, there is no clearance and no flow through the valve assembly 520. A user can adjust the finishing compound 406 flow, as desired, by rotating the flow adjustment knob 572 in either direction between no clearance and maximum clearance.

In addition to the simplified operation of the system 502 with the push-to-release and flow adjustment features described above, the system 502 accommodates efficient maintenance and cleaning. For example, the valve assembly 520 can easily be separated from the applicator head 408, 414 by unsnapping the ball-and-socket joint. The valve assembly 520 can be unscrewed from the dispensing head 424. Unscrewing the nut 560 releases the valve member 556 and the return compression spring 562. The entire valve assembly 520 can be further disassembled by tapping the guide pin 546 through the receivers 548, thus releasing the outer and inner sleeves 530, 536 from each other. The separated parts can then be cleaned, maintained, and/or replaced, as necessary. Other parts of the system 502 can likewise be efficiently disassembled, cleaned, maintained, and/or replaced.

In additional embodiments of the present invention, an application system and method of use having the features discussed herein may be configured for use with application or release of alternative viscous compounds other than drywall finishing compound.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A system for applying a finishing material to a work surface, which system comprises:
 a handle assembly having a proximal end and a distal end and a handle bore extending between said proximal and distal ends;
 a material reservoir mounted on said handle assembly distal end, said reservoir including an interior configured for holding a quantity of finishing material, an inlet to said interior, and an outlet from said interior;
 said reservoir inlet configured for admitting said finishing material into said reservoir interior and said reservoir outlet configured for discharging said finishing material from said reservoir interior;
 a push-to-open valve assembly connected to said reservoir outlet, said valve assembly having a closed, extended position and an open, contracted position;
 an applicator head mounted to said valve assembly and configured for receiving said finishing material from said reservoir through said valve assembly with said valve assembly in said open position and for applying said finishing material to a work surface;
 said handle assembly comprising a linear actuator mounted in said handle bore and moveable between extended and retracted positions;
 said linear actuator comprising a plunger in said reservoir, said plunger configured for advancing said finishing material through said reservoir and discharging said finishing material through said outlet with said valve assembly in said open position;
 said valve assembly comprising a hollow sleeve having a proximal end and a distal end, said hollow sleeve proximal end positioned within said reservoir interior and said hollow sleeve distal end configured for attachment to said applicator head;
 said valve assembly further comprising a valve member reciprocably mounted in said hollow sleeve and moveable between a closed position closing said hollow sleeve proximal end with said valve assembly in its closed position and an open position with said valve member spaced from said sleeve proximal end and admitting said finishing material from said reservoir interior into said hollow sleeve;
 said hollow sleeve comprising an outer sleeve connected to said reservoir and an inner sleeve reciprocably positioned within said outer sleeve;
 said outer and inner sleeves each including proximal and distal ends and a sleeve bore extending between said proximal and distal sleeve ends;
 said inner sleeve bore reciprocably receiving said valve member;
 a valve return spring positioned coaxially in said inner sleeve and connected to said valve member;
 said valve return spring having an expanded configuration biasing said valve member in said closed position sealing said inner sleeve and outer sleeve proximal ends and a contracted position with said valve member in said open position spaced from said outer sleeve proximal end;
 said valve assembly being movable from said closed position to said open position by pushing said applicator head against said work surface;
 said valve assembly comprising a flow adjustment mechanism for adjustment of finishing material flow through said valve assembly with said valve assembly in said open position;
 said flow adjustment mechanism comprising an adjustable knob having a proximal end and a distal end and a stop collar configured for making contact with said adjustable knob distal end with said valve assembly in said open position and preventing further contraction of said valve assembly;
 said adjustable knob being moveable in relation to said stop collar, wherein moving said adjustable knob further from said stop collar provides more finishing material flow through said valve assembly with said valve assembly in said open position, and moving said adjustable knob closer to said stop collar provides less finishing material flow through said valve assembly with said valve assembly in said open position;
a valve guide pin mounted in and extending across said outer sleeve bore;
said valve guide pin including opposite ends each attached to said outer sleeve diametrically across said outer sleeve bore;
said valve guide pin including a hole coaxially aligned with said inner and outer sleeves;
said valve member including a male-threaded valve stem coaxially aligned with said inner and outer sleeves and reciprocably received in said valve guide pin hole and a valve head coaxially mounted on said valve stem and configured for sealing said outer sleeve proximal end with said valve member in said closed position; and
a valve return spring tension adjustment nut threadably mounted on said valve stem and configured for threadably adjusting tension in said valve return spring.

2. The system according to claim 1 wherein:
said adjustable knob comprises internal threads;
said valve assembly comprises flow adjustment mechanism external threads;
said adjustable knob internal threads are threadably received within said flow adjustment mechanism external threads; and
rotation of said adjustable knob moves said adjustable knob in relation to said stop collar.

3. The system according to claim 1 wherein:
moving said adjustable knob further from said stop collar provides more finishing material flow through said valve assembly with said valve assembly in said open position; and
moving said adjustable knob closer to said stop collar provides less finishing material flow through said valve assembly with said valve assembly in said open position.

4. The system according to claim 1, wherein:
movement of said adjustable knob in relation to said stop collar is selected from the group consisting of: threaded adjustment; ratcheted adjustment; removable cotter pin and associated grooves; toothed adjustment; articulated adjustment; and snapping adjustment.

5. The system according to claim 1, wherein:
said reservoir comprises a dispensing head at its distal end;
said dispensing head comprises a threaded bore;
said outer sleeve comprises a threaded section at its proximate end configured for being threadably received in said dispensing head threaded bore;
said inner sleeve distal end comprises a partially spherical collar coaxial with said inner sleeve bore; and
said applicator tool comprises a socket configured for receiving said partially spherical collar and forming a ball-and-socket, universal joint.

6. The system according to claim 5, wherein said outer sleeve further comprises:
an outwardly-extending piece configured for aligning with the distal end of said dispensing head with said valve assembly assembled within said dispensing head; and
said outwardly-extending piece comprising a pair of parallel wrench flats.

7. The system according to claim 1, wherein said linear actuator comprises:
a gas cylinder unit configured for extending said plunger into said reservoir and discharging said finishing material with said valve assembly in said open position.

8. The system according to claim 1, wherein:
said adjustable knob comprises internal threads;
said valve assembly comprises flow adjustment mechanism external threads;
said adjustable knob internal threads are threadably received within said flow adjustment mechanism external threads; and
rotation of said adjustable knob moves said adjustable knob in relation to said stop collar.

9. The system according to claim 1, wherein:
movement of said adjustable knob in relation to said stop collar is selected from the group consisting of: threaded adjustment; ratcheted adjustment; removable cotter pin and associated grooves; toothed adjustment; articulated adjustment; and snapping adjustment.

10. The system according to claim 1 further comprising:
a pair of guide pin slots formed in said inner sleeve; and
each guide pin slot slidably receiving a respective valve guide pin end.

11. The system according to claim 1, wherein:
said reservoir comprises a dispensing head at its distal end;
said dispensing head comprises a threaded bore;
said outer sleeve comprises a threaded section at its proximate end configured for being threadably received in said dispensing head threaded bore;
said inner sleeve distal end comprises a partially spherical collar coaxial with said inner sleeve bore; and
said applicator tool comprises a socket configured for receiving said partially spherical collar and forming a ball-and-socket, universal joint.

12. The system according to claim 11, wherein said outer sleeve further comprises:
an outwardly-extending piece configured for aligning with the distal end of said dispensing head with said valve assembly assembled within said dispensing head; and
said outwardly-extending piece comprising a pair of parallel wrench flats.

* * * * *